United States Patent
Pittu et al.

(10) Patent No.: US 10,776,545 B2
(45) Date of Patent: Sep. 15, 2020

(54) METHOD OF DETERMINING A WORST CASE IN TIMING ANALYSIS

(71) Applicant: TAIWAN SEMICONDUCTOR MANUFACTURING COMPANY LTD., Hsinchu (TW)

(72) Inventors: Ravi Babu Pittu, Andhra Pradesh (IN); Li-Chung Hsu, Hsinchu (TW); Sung-Yen Yeh, Pingtung County (TW); Chung-Hsing Wang, Hsinchu County (TW)

(73) Assignee: TAIWAN SEMICONDUCTOR MANUFACTURING COMPANY LTD., Hsinchu (TW)

(*) Notice: Subject to any disclaimer, the term of this patent is extended or adjusted under 35 U.S.C. 154(b) by 113 days.

(21) Appl. No.: 15/719,516

(22) Filed: Sep. 28, 2017

(65) Prior Publication Data

US 2019/0095562 A1    Mar. 28, 2019

(51) Int. Cl.
  *G06F 30/3312*    (2020.01)
  *G06F 30/30*    (2020.01)
  *G06F 30/367*    (2020.01)

(52) U.S. Cl.
  CPC .......... *G06F 30/3312* (2020.01); *G06F 30/30* (2020.01); *G06F 30/367* (2020.01)

(58) Field of Classification Search
  CPC ............. G06F 17/5031; G06F 17/5045; G06F 17/5036; G06F 30/3312; G06F 30/30; G06F 30/367
  See application file for complete search history.

(56) References Cited

U.S. PATENT DOCUMENTS

| | | | | |
|---|---|---|---|---|
| 5,148,058 A * | 9/1992 | Stewart | ........... | G09G 3/2011 326/121 |
| 7,137,082 B1 * | 11/2006 | Zohar | ........... | G06F 17/505 716/102 |
| 7,600,204 B1 * | 10/2009 | Chirania | ........... | G06F 17/5036 716/106 |
| 2010/0275169 A1 * | 10/2010 | Goswami | ........... | G06F 17/504 716/103 |
| 2011/0257954 A1 * | 10/2011 | Soni | ........... | G06F 17/5036 703/14 |
| 2011/0313738 A1 * | 12/2011 | Stamoulis | ........... | G06F 17/5036 703/2 |
| 2012/0096424 A1 * | 4/2012 | Burd | ........... | G06F 17/5036 716/136 |
| 2013/0275929 A1 * | 10/2013 | Suzuki | ........... | G06F 17/505 716/104 |

(Continued)

OTHER PUBLICATIONS

"Scalable Methods For Analyzing the Circuit Failure Probability Due to Gate Oxide Breakdown", JianXin Fang and Sachin S. Sapatnekar, Nov. 2012 @IEEE.*

*Primary Examiner* — Nha T Nguyen
(74) *Attorney, Agent, or Firm* — WPAT, P.C., Intellectual Property Attorneys; Anthony King

(57) ABSTRACT

A method includes identifying a timing path in a transistor level from a graph diagram; calculating a plurality of aging costs associated with the timing path based on a plurality of forms of a DC vector; identifying a first form, associated with a first aging cost of the aging costs, from the forms; and identifying a second form, associated with a second aging cost less than the first aging cost, from the forms.

17 Claims, 19 Drawing Sheets

(56) References Cited

U.S. PATENT DOCUMENTS

| | | | |
|---|---|---|---|
| 2014/0165017 A1* | 6/2014 | Barnaby | G06F 17/5036 |
| | | | 716/112 |
| 2015/0162199 A1* | 6/2015 | Potkonjak | G06F 17/5045 |
| | | | 438/758 |
| 2016/0223609 A1* | 8/2016 | Hwang | H03K 17/102 |
| 2018/0052950 A1* | 2/2018 | Hofmann | G06F 17/5045 |
| 2018/0096087 A1* | 4/2018 | Hsu | G06F 17/5036 |
| 2018/0218100 A1* | 8/2018 | Srinivasan | G06F 17/504 |
| 2018/0336293 A1* | 11/2018 | Liu | G06F 17/505 |
| 2019/0044513 A1* | 2/2019 | Ng | H03K 19/00315 |

\* cited by examiner

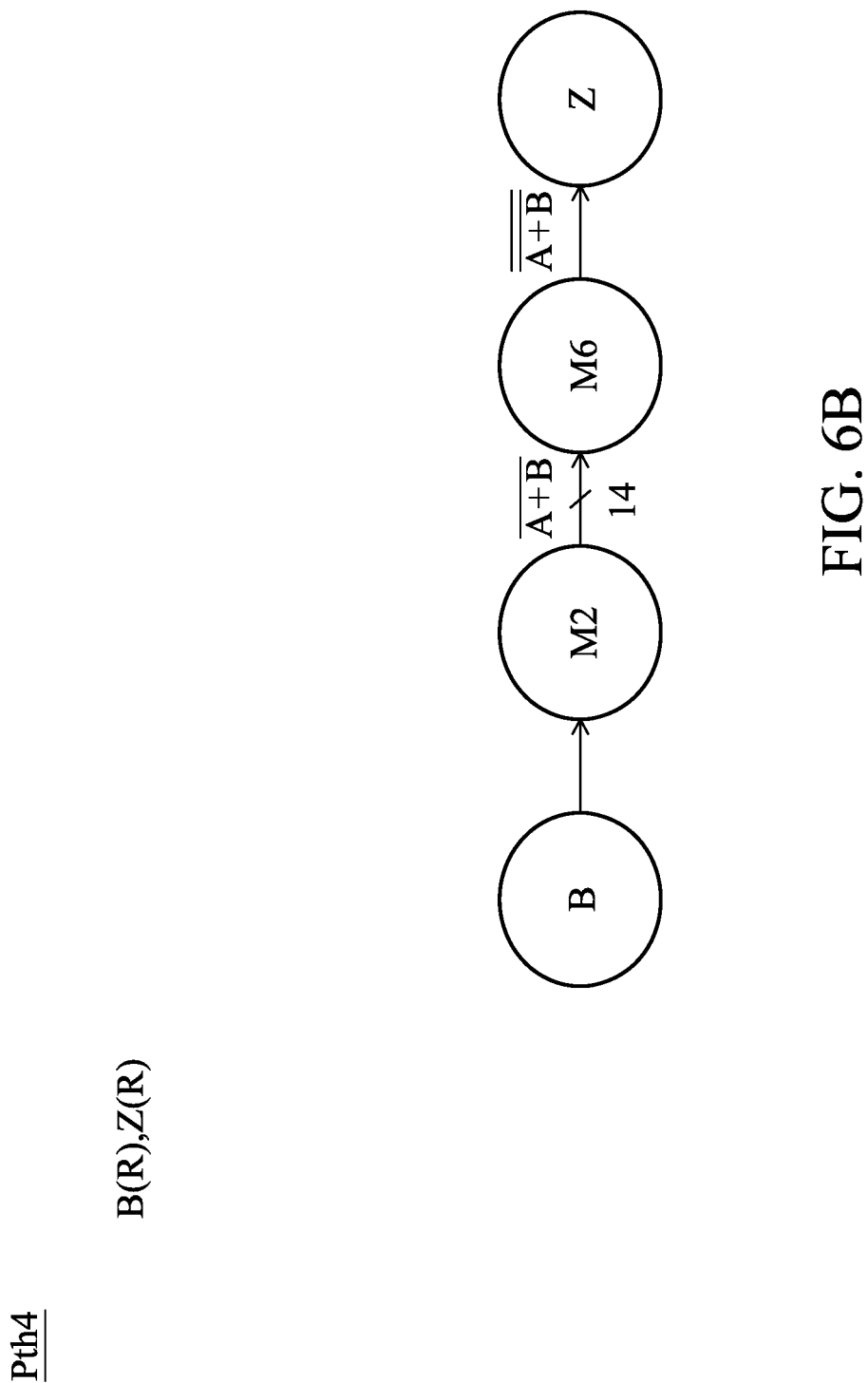

METHOD OF DETERMINING A WORST CASE IN TIMING ANALYSIS

BACKGROUND

System-on-chip (SoC) technology integrates multiple functional blocks on a single silicon chip. The multiple functional blocks may include digital circuits, analog circuits, mixed-signal circuits or any combination thereof. SoC technology reduces development cycle and manufacture costs and increases product reliability, functionality and performance.

However, an SoC chip is relatively complicated. Such a complicated chip having various types of functional blocks demands a thorough reliability analysis before going through an expensive and time-consuming fabrication process. Semiconductor aging has emerged as a major factor for SoC chip's reliability. Aging induced defects include Hot Carrier Injection (HCI), which relates to the change in electrons/holes' mobility; Electron-Migration (EM), which relates to the gradual displacement of ions in a conductor as a result of current flowing through the conductor; Negative Bias Temperature Instability (NBTI), which relates to a shift of a threshold voltage of a transistor; and Time Dependent Dielectric Breakdown (TDDB), which relates to the damage caused to the gate oxide region of a transistor. In short, HCI, EM, NBTI and TDDB are major mechanisms of device degradation due to aging effects.

Conventionally, design reliability margin is given by the worst-case assumption. That is, the user usage model of a design is assumed to be operated at high voltage and temperature over expected lifetime. As a result, over design issues in early development stage are incurred. Simulation tools such as Simulation Program with Integrated Circuits Emphasis (SPICE) can be used to simulate aging induced defects.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 6B is a diagram illustrating the fourth timing path shown in FIG. 6A, in accordance with some embodiments.

DETAILED DESCRIPTION

Figure 1:
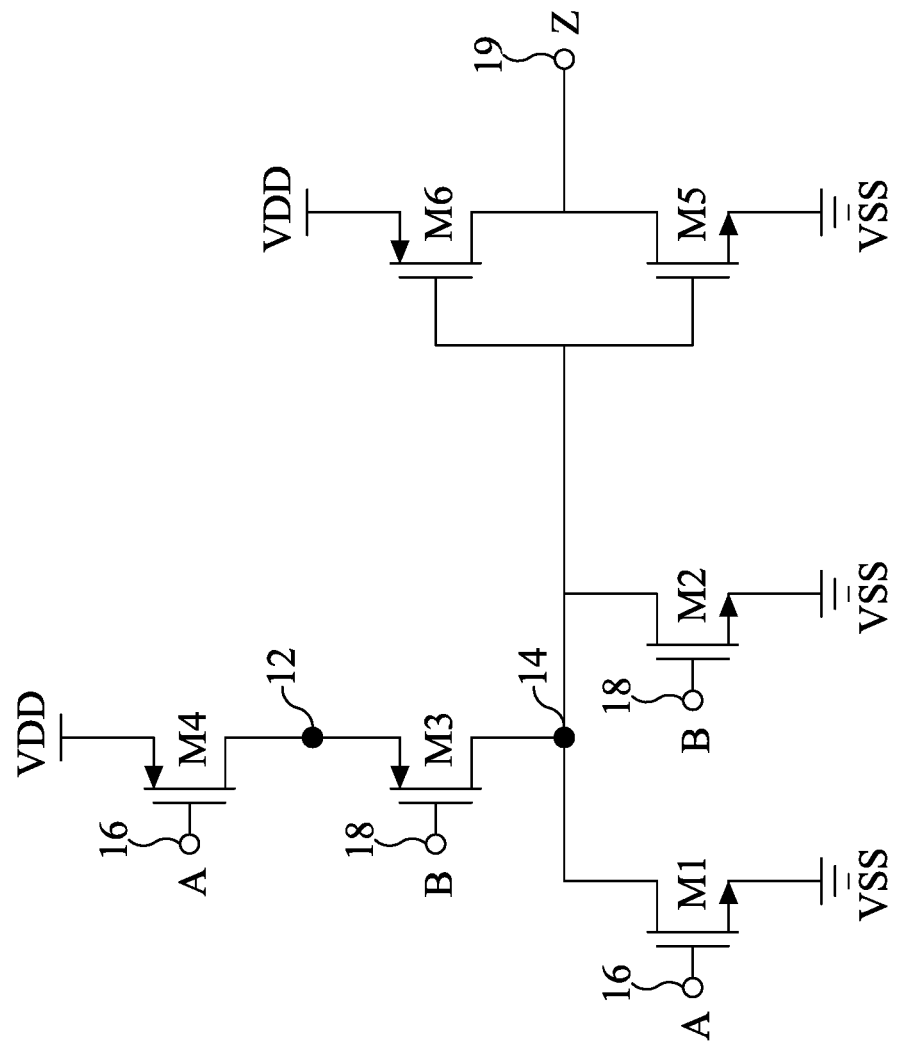
FIG. 1 is a circuit diagram of a logic circuit, in accordance with some embodiments.

The following disclosure provides many different embodiments, or examples, for implementing different features of the invention. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

FIG. 1 is a circuit diagram of a logic circuit 10, in accordance with some embodiments. Referring to FIG. 1, the logic circuit 10 is a graph diagram converted from a netlist in a transistor level. The netlist can be derived from, for example, any suitable storage devices. The logic circuit 10 operates in a power domain defined by a supply voltage VDD and a reference ground voltage VSS. The logic circuit 10 receives a DC (direct-current) vector including a combination of voltages A and B at its inputs 16 and 18, and outputs an output signal Z in response to the DC vector at its output 19. The number of voltages for a DC vector is not limited to two. The quantity is determined based on a design of a logic circuit. For example, when a logic circuit includes three inputs, the quantity is three. In an embodiment, the logic circuit 10 includes a CMOS logic circuit.

The logic circuit 10 includes transistors M1, M2, M3, M4, M5 and M6, which in combination define a logic OR gate. However, the logic circuit 10 is not limited to a logic OR gate. The logic circuit 10 may include any suitable logic circuits, such as an inverter, a logic AND gate, and a logic XOR gate. Each of the transistors M1, M2 and M5 includes an n-type transistor, and each of the transistors M3, M4 and M6 includes a p-type transistor. In an embodiment, each of the transistors M1, M2 and M5 includes an NMOS transistor, and each of the transistors M3, M4 and M6 includes a PMOS transistor.

Figure 2:
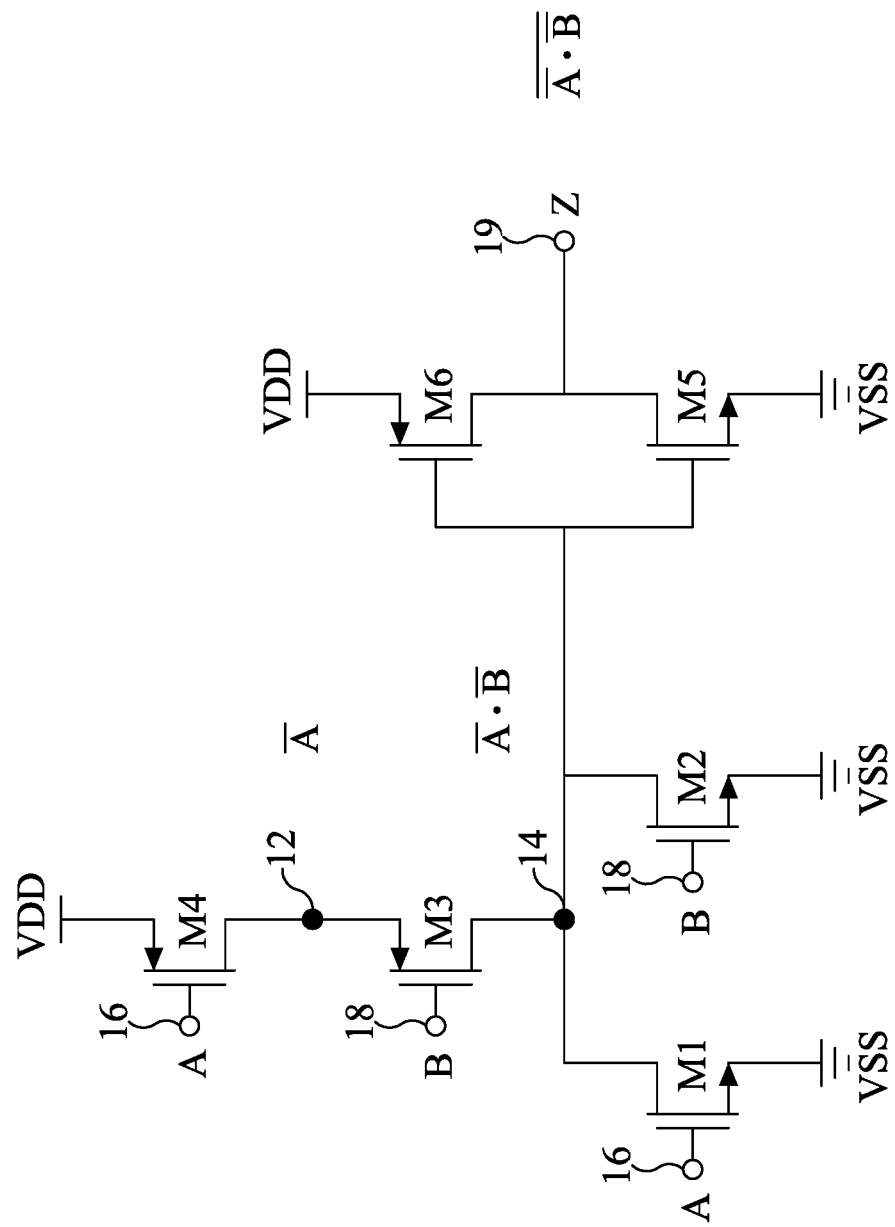
FIG. 2 is a circuit diagram of the logic circuit shown in FIG. 1 with a boolean expression, in accordance with some embodiments.

FIG. 2 is a circuit diagram of the logic circuit 10 shown in FIG. 1 with a boolean expression, in accordance with some embodiments. Referring to FIG. 2, a boolean expression for each internal nodes 12 and 14 of the logic circuit 10 shown on the graph diagram is determined. In the present disclosure, a term "internal node" can be interpreted as a tap between two electronic components.

In determining the boolean expression, a start point is selected. For example, a gate of the transistor M4 is selected as the start point. When the transistor M4 is conducted, the gate (the start point) of the transistor M4 in voltage level is opposite to the internal node 12. Therefore, in response to the voltage A at the gate of the transistor M4, a boolean expression at the internal node 12 is denoted as A. Similarly, when the transistor M3 is conducted, the internal node 12 in voltage level is opposite to the gate of the transistor M4. Moreover, a voltage level at a drain of the transistor M3 would also affect a voltage level at the internal node 14. As a result, a boolean expression at the internal node 14 is denoted as $\overline{A \cdot B}$. The transistors M5 and M6 form an inverter. Accordingly, a voltage level at a gate of the transistor M6 is opposite to that at its drain. As a result, by function of the inverter, a boolean expression at the output 19 of the logic circuit 10 is denoted as $\overline{A \cdot B}$.

Figure 3A:
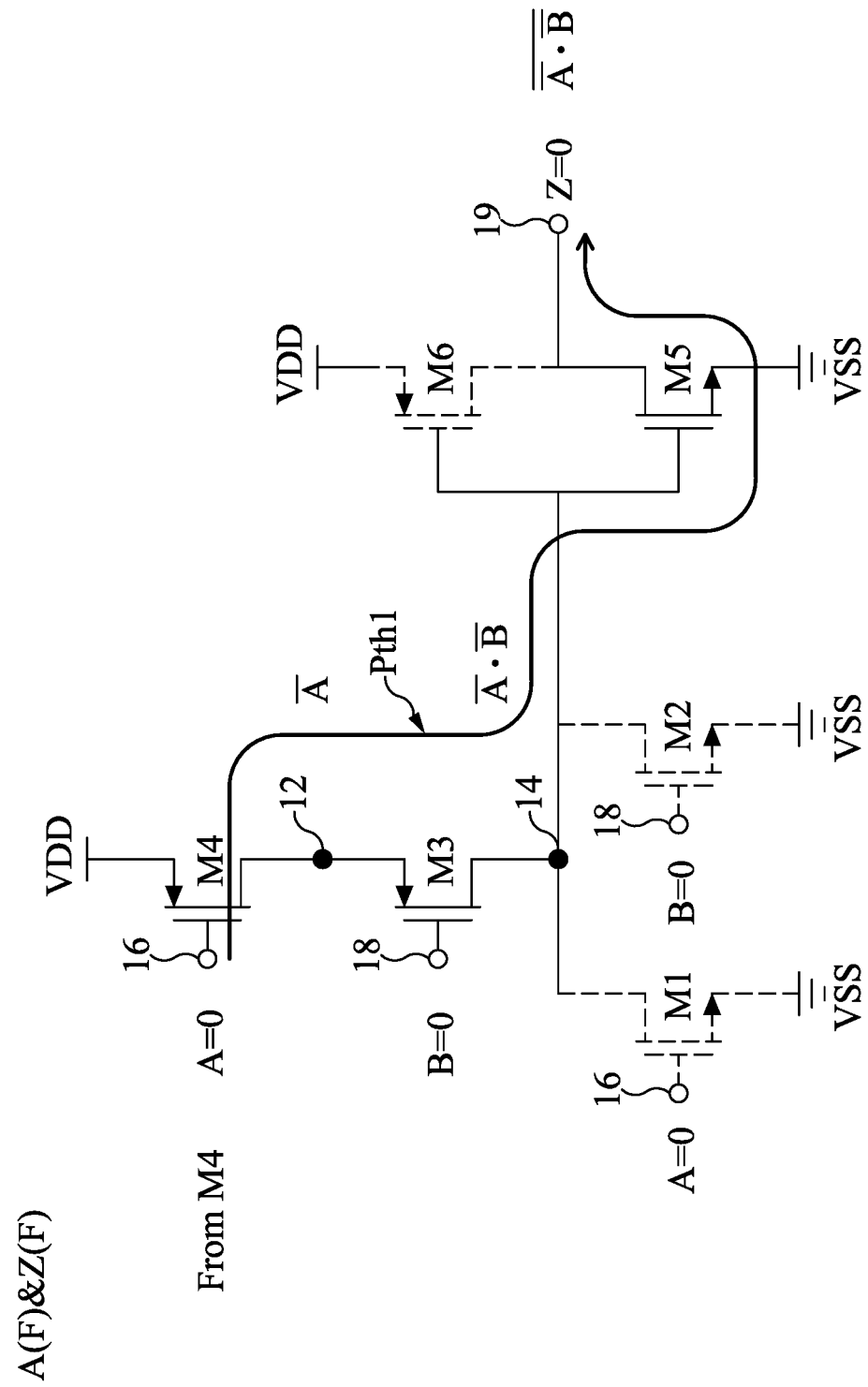
FIG. 3A is a circuit diagram illustrating a first timing path of the logic circuit shown in FIG. 1 with a boolean expression, in accordance with some embodiments.

FIG. 3A is a circuit diagram illustrating a first timing path Pth 1 of the logic circuit 10 shown in FIG. 1 with a boolean expression, in accordance with some embodiments. When a logic circuit has more than one inputs, a plurality of timing paths exist and each of which will be analyzed one by one. To identify a timing path, a start point and an end point of a flow are required to be determined. Generally, an input and an output of the logic circuit are determined as the start point and the end point, respectively. Moreover, when a flow from a start point receiving a voltage to an end point includes a transistor controlled by another voltage, to determine the boolean expression the transistor is deemed as being conducted.

Referring to FIG. 3A, the gate of the transistor M4, serving as the input 16 of the logic circuit 10 receiving the voltage A, is determined as a start point of a flow. A drain of the transistor M5, serving as the output 19, which outputs the voltage Z, of the logic circuit 10, is determined as an end point of the flow. Since the flow from the gate of the transistor M4 receiving the voltage A to the drain of the transistor M5 includes the transistor M3 controlled by another voltage B, the transistor M3 is deemed as being conducted. In response to the conducted state of the transistors M4 and M3, the voltage level at the internal node 14 is logic high. Accordingly, the transistor M5 is conducted. As a result, the flow is completed and the first timing path Pth1 in the transistor level is identified from the graph diagram.

Moreover, to conduct the transistors M3 and M4, the voltages A and B are logic low. Accordingly, the transistors M1 and M2 are not conducted.

Additionally, when performing a timing analysis, a previous voltage level of a voltage of a combination of a DC vector is involved and is opposite to a current voltage level of the voltage. Also, a current voltage level of a voltage at an output of a logic circuit is opposite to a previous voltage level of the voltage at the output of the logic circuit.

Taking the embodiment of FIG. 3 for instance, to currently conduct the transistor M4, a current voltage level of the voltage A is logic low. Accordingly, a previous voltage level of the voltage A is logic high. Such circumstance means that a voltage level of the voltage A falls. Moreover, in response to the current voltage level of the voltages A and B with logic low, a current voltage level of the voltage Z is logic low. Accordingly, a previous voltage level of the voltage Z is logic high. Such circumstance means that a voltage level of the voltage Z falls. Therefore, the exemplary case illustrated in FIG. 3A is a case where the voltage A falls and the voltage Z falls, denoted A(F) & Z(F).

Figure 3B:
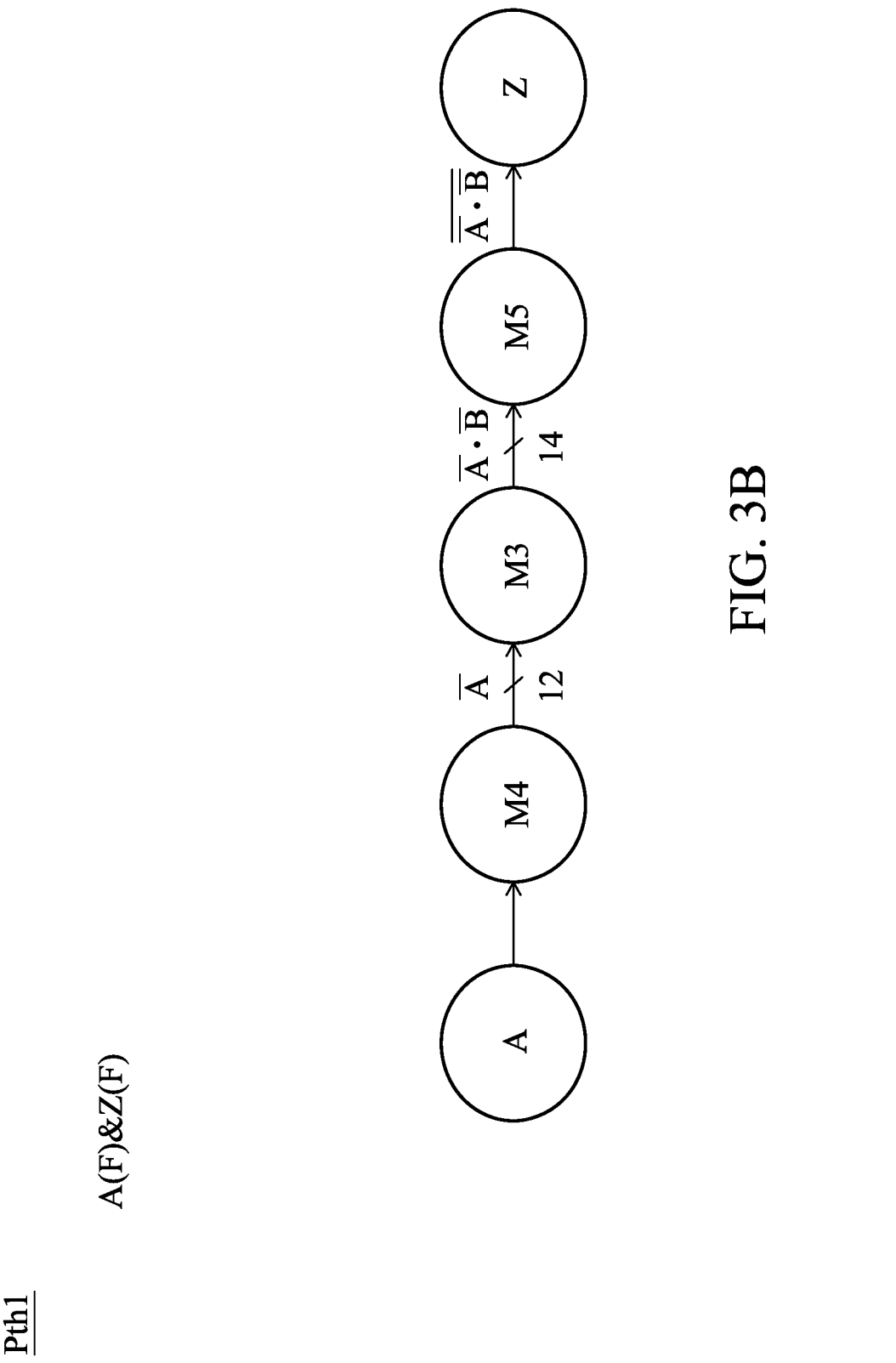
FIG. 3B is a diagram illustrating the first timing path shown in FIG. 3A, in accordance with some embodiments.

FIG. 3B is a diagram illustrating the first timing path Pth1 shown in FIG. 3A, in accordance with some embodiments. Referring to FIG. 3B, the first timing path Pth1 is derived from the logic circuit 10 shown in FIG. 3A. Presenting the first timing path Pth1 in a way as shown in FIG. 3B facilitates analysis of an aging cost, which will be described in detail below. By using the approach of the present disclosure, a worst case and a best case of forms of a DC vector can be evaluated and identified without performing a circuit simulation via, for example, an HSPICE tool. As a result, computational resource is efficient.

Figure 4A:
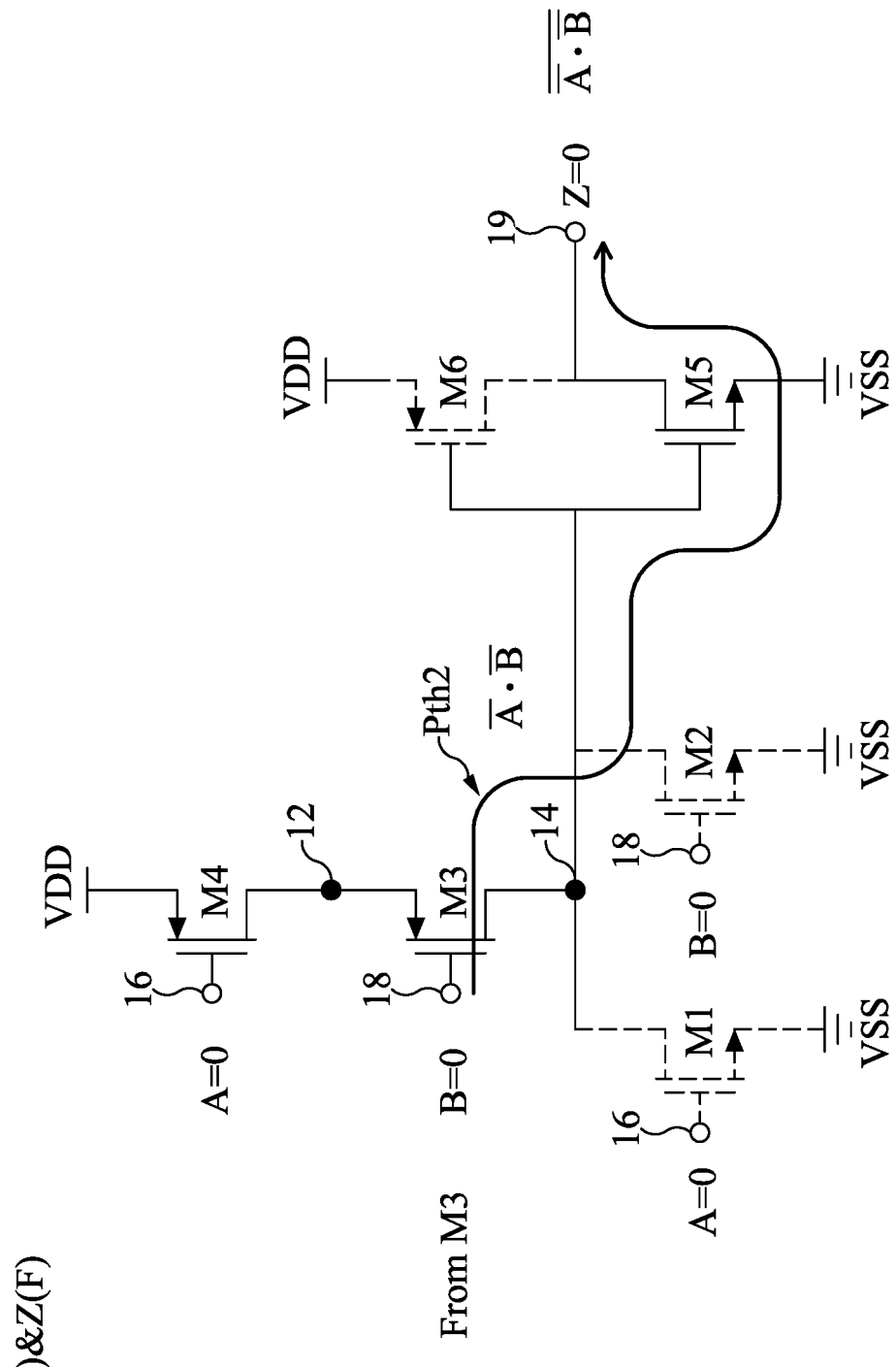
FIG. 4A is a circuit diagram illustrating a second timing path of the logic circuit shown in FIG. 1 with a boolean expression, in accordance with some embodiments.

FIG. 4A is a circuit diagram illustrating a second timing path Pth2 of the logic circuit 10 shown in FIG. 1 with a boolean expression, in accordance with some embodiments. Referring to FIG. 4A, a gate of the transistor M3, serving as the input 18 of the logic circuit 10 receiving the voltage B, is determined as a start point of a flow. The drain of the transistor M5, serving as the output 19, which outputs the voltage Z, of the logic circuit 10, is determined as an end point of the flow. To establish the flow, the transistor M3 is conducted, resulting in a logic high state at the internal node 14. Accordingly, the transistor M5 is conducted. As a result, the flow is completed and the second timing path Pth2 in the transistor level is identified from the graph diagram.

Moreover, to currently conduct the transistor M3, a current voltage level of the voltage B is logic low. Accordingly, a previous voltage level of the voltage B is logic high. Such circumstance means that a voltage level of the voltage B falls. Moreover, in response to the current voltage level of the voltages A and B with logic low, a current voltage level of the voltage Z is logic low. Accordingly, a previous voltage level of the voltage Z is logic high. Such circumstance means that a voltage level of the voltage Z falls. Therefore, the exemplary case illustrated in FIG. 4A is a case where the voltage B falls and the voltage Z falls, denoted B(F) & Z(F).

Figure 4B:
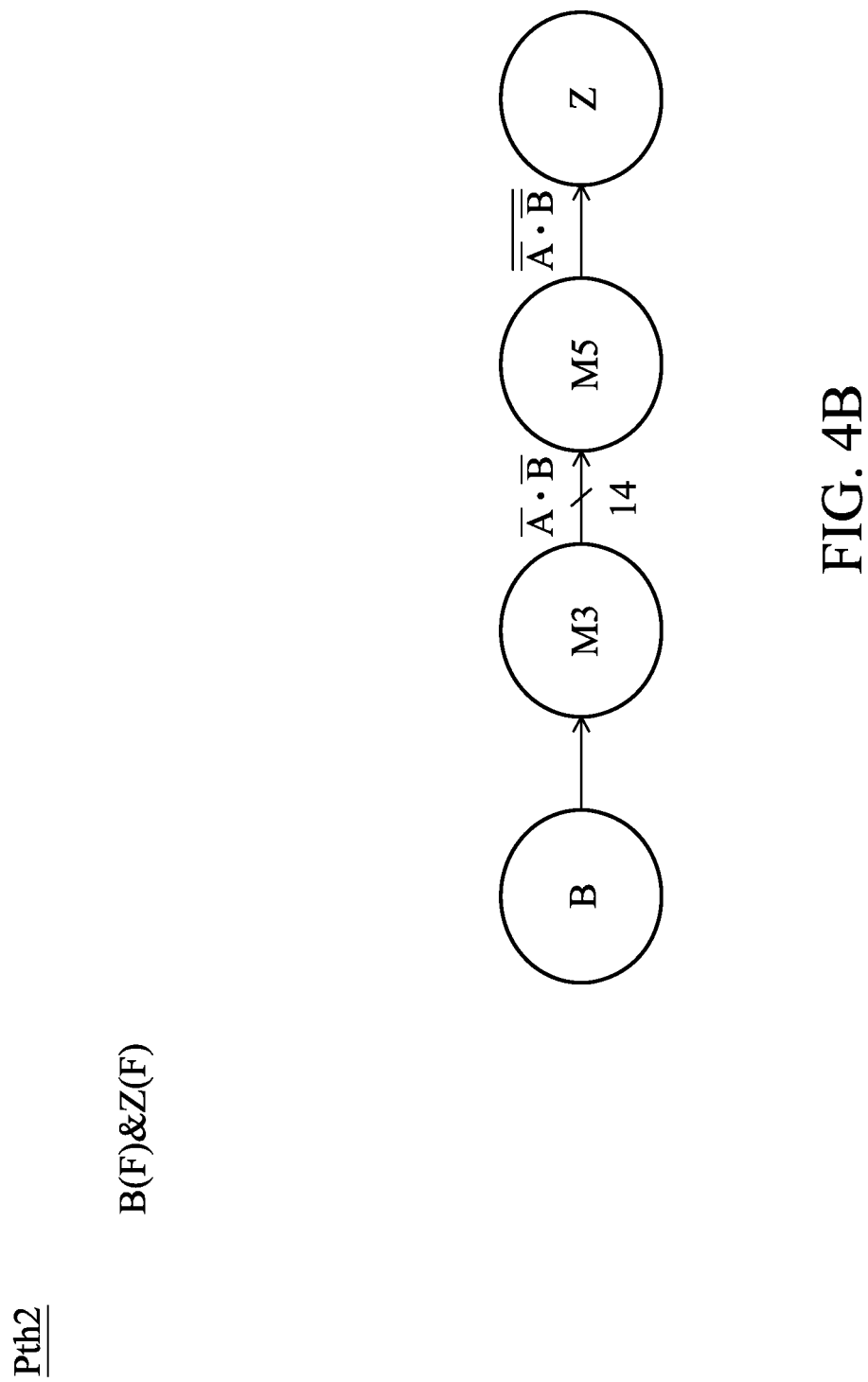
FIG. 4B is a diagram illustrating the second timing path shown in FIG. 4A, in accordance with some embodiments.

FIG. 4B is a diagram illustrating the second timing path Pth2 shown in FIG. 4A, in accordance with some embodiments. Referring to FIG. 4B, the second timing path Pth2 is derived from the logic circuit 10 shown in FIG. 4A. Presenting the second timing path Pth2 in a way as shown in FIG. 4B facilitates analysis of an aging cost, as mentioned in the embodiment of FIG. 3B. By using the approach of the present disclosure, a worst case and a best case of forms of a DC vector can be evaluated without performing a circuit simulation via, for example, an HSPICE tool. As a result, computational resource is efficient.

Figure 5A:
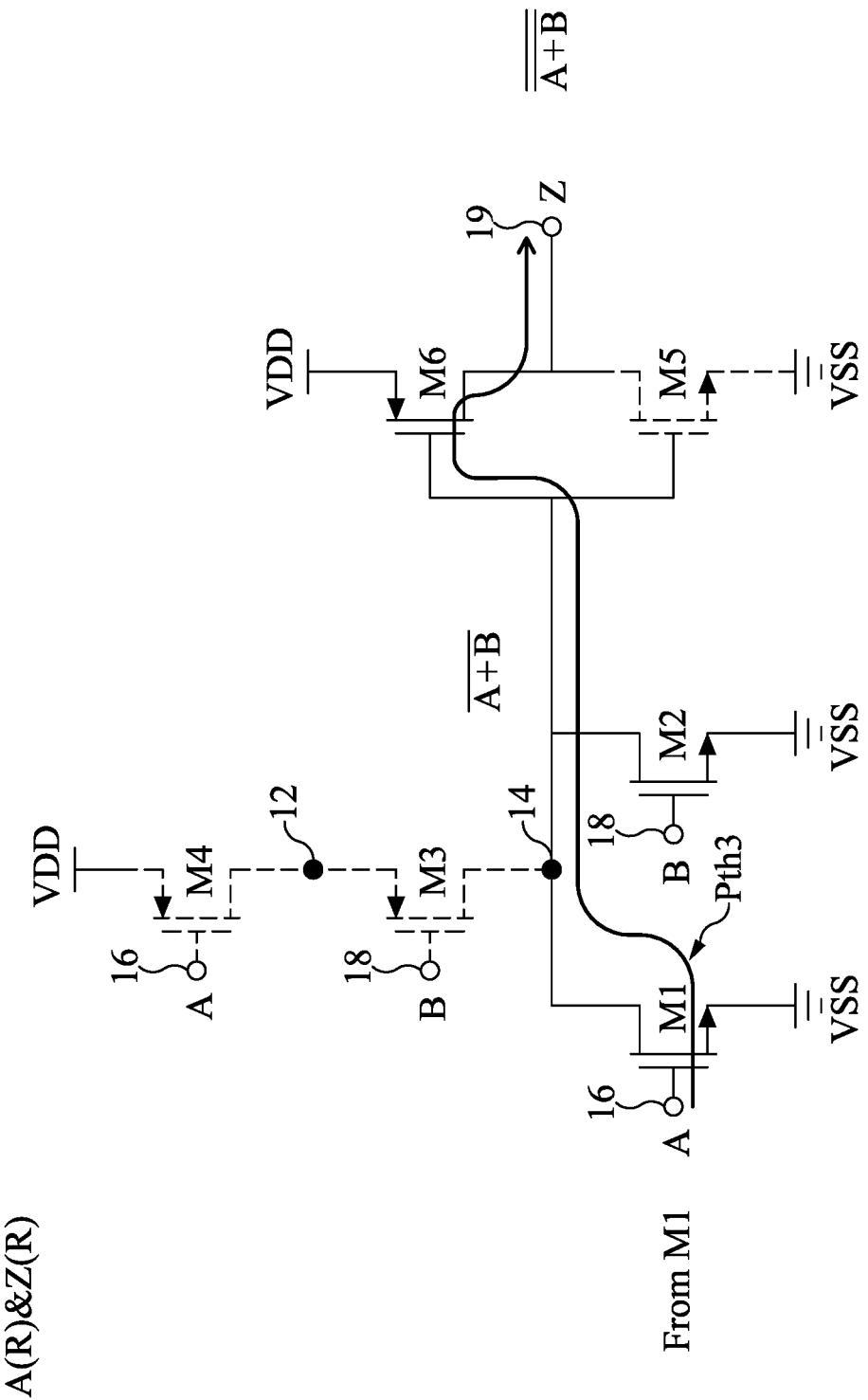
FIG. 5A is a circuit diagram illustrating a third timing path of the logic circuit shown in FIG. 1 with a boolean expression, in accordance with some embodiments.

FIG. 5A is a circuit diagram illustrating a third timing path Pth3 of the logic circuit 10 shown in FIG. 1 with a boolean expression, in accordance with some embodiments. Referring to FIG. 5A, a gate of the transistor M1, serving as the input 16 of the logic circuit 10 receiving the voltage A, is determined as a start point of a flow. The drain of the transistor M6, serving as the output 19, which outputs the voltage Z, of the logic circuit 10, is determined as an end point of the flow. To establish the flow, the transistor M1 is conducted, resulting in a logic low state at the internal node 14. Accordingly, the transistor M6 is conducted. As a result, the flow is completed and the third timing path Pth3 in the transistor level is identified from the graph diagram.

Moreover, since the flow starts at the gate of the transistor M1, the boolean expression is denoted as $\overline{A+B}$, which equals to the boolean expression $\overline{A} \cdot \overline{B}$—.

Additionally, to currently conduct the transistor M1, a current voltage level of the voltage A is logic high. Accordingly, a previous voltage level of the voltage A is logic low. Such circumstance means that a voltage level of the voltage A rises. Moreover, in response to the current voltage level of the voltage A with logic high, a current voltage level of the voltage Z is logic high. Accordingly, a previous voltage level of the voltage Z is logic low. Such circumstance means that a voltage level of the voltage Z rises. Therefore, the exemplary case illustrated in FIG. 5A is a case where the voltage A rises and the voltage Z rises, denoted A(R) & Z(R).

Figure 5B:
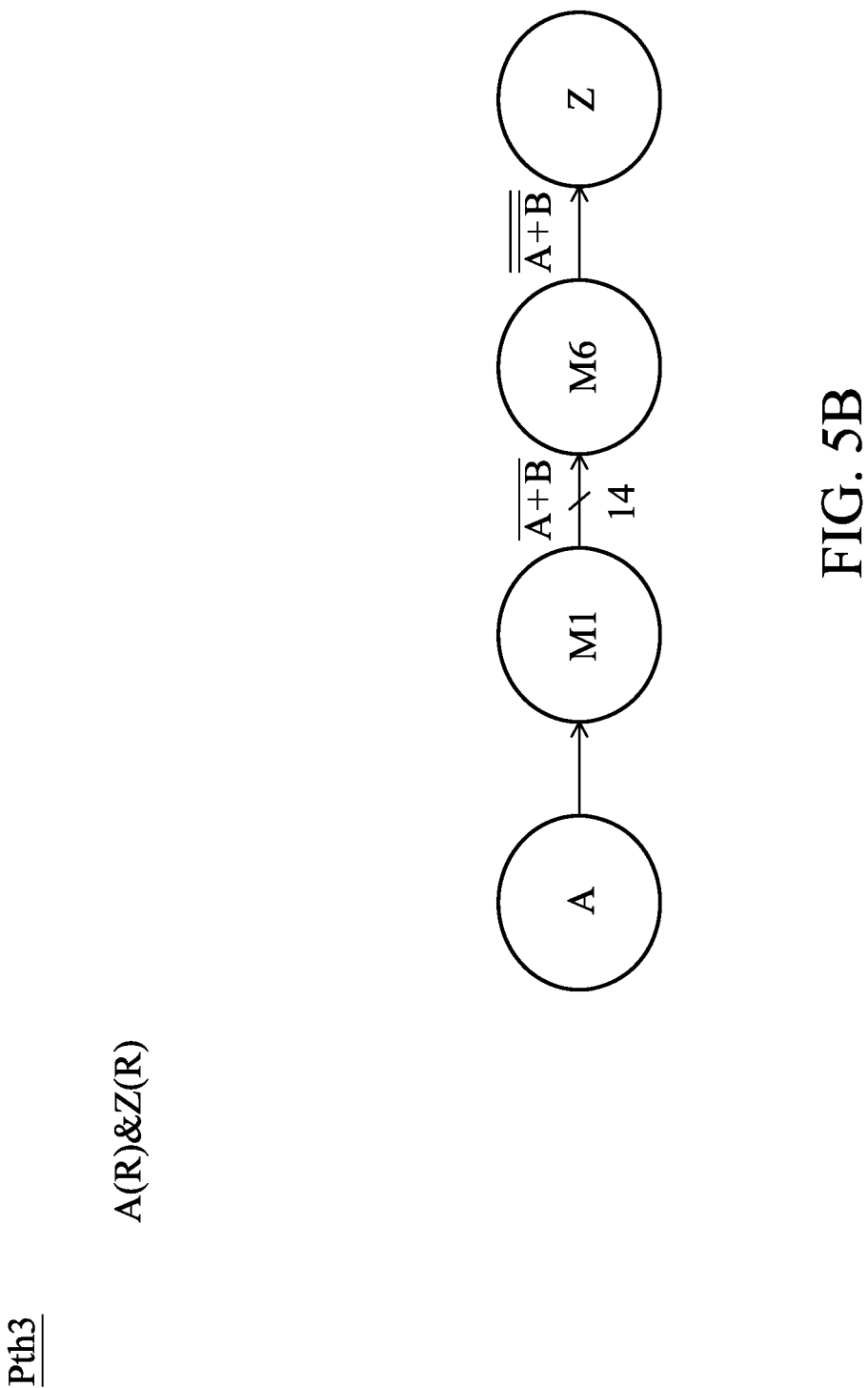
FIG. 5B is a diagram illustrating the third timing path shown in FIG. 5A, in accordance with some embodiments.

FIG. 5B is a diagram illustrating the third timing path Pth3 shown in FIG. 5A, in accordance with some embodiments. Referring to FIG. 5B, the third timing path Pth3 is derived from the logic circuit 10 shown in FIG. 5A. Presenting third timing path Pth3 in a way as shown in FIG. 5B facilitates analysis of an aging cost, as mentioned in the embodiment of FIG. 3B. By using the approach of the present disclosure, a worst case and a best case of forms of a DC vector can be evaluated and identified without performing a circuit simulation via, for example, an HSPICE tool. As a result, computational resource is efficient.

Figure 6A:
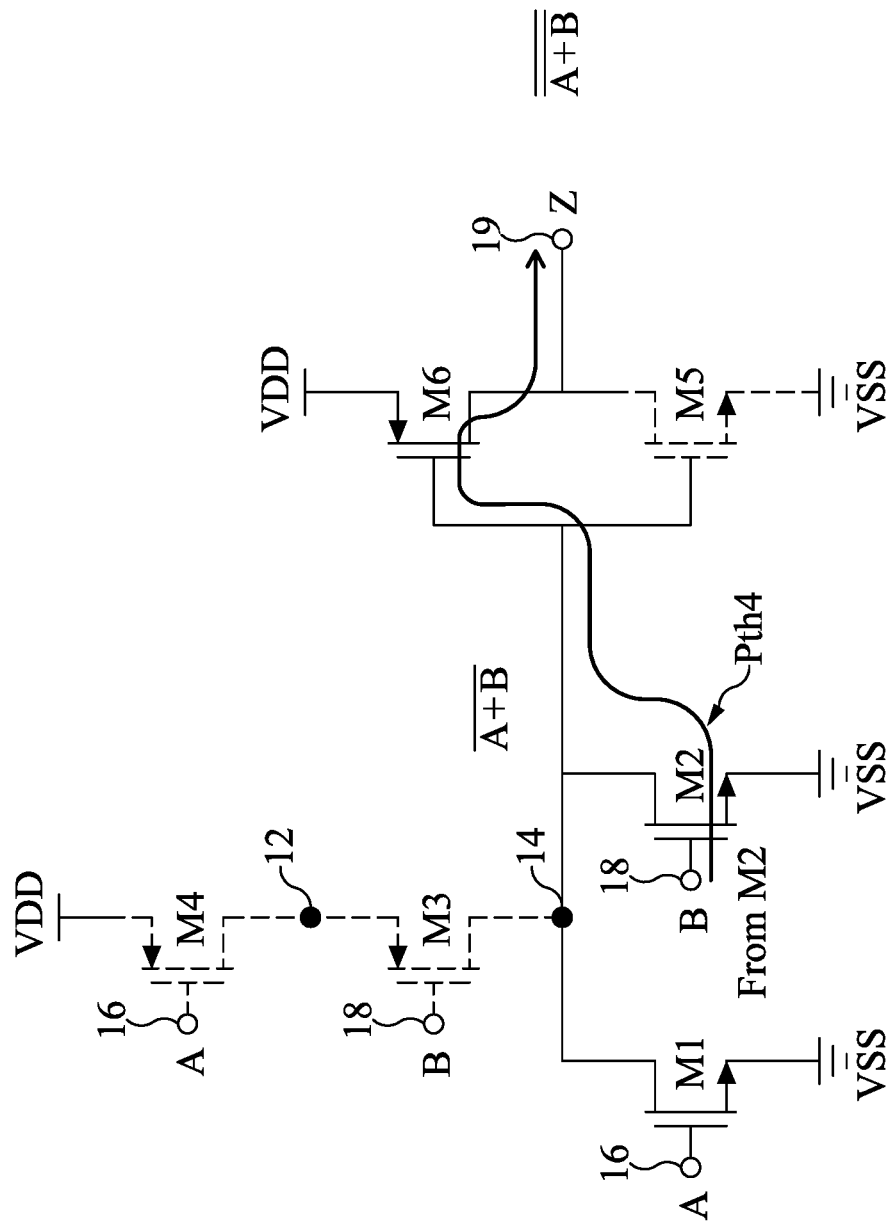
FIG. 6A is a circuit diagram illustrating a fourth timing path of the logic circuit shown in FIG. 1 with a boolean expression, in accordance with some embodiments.

FIG. 6A is a circuit diagram illustrating a fourth timing path Pth4 of the logic circuit 10 shown in FIG. 1 with a boolean expression, in accordance with some embodiments. Referring to FIG. 6A, a gate of the transistor M2, serving as the input 18 of the logic circuit 10 receiving the voltage B, is determined as a start point of a flow. The drain of the transistor M6, serving as the output 19, outputting the voltage Z, of the logic circuit 10, is determined as an end point of the flow. To establish the flow, the transistor M2 is conducted, resulting in a logic low state at the internal node 14. Accordingly, the transistor M6 is conducted. As a result, the flow is completed and the fourth timing path Pth4 in the transistor level is identified from the graph diagram.

Additionally, to currently conduct the transistor M2, a current voltage level of the voltage B is logic high. Accordingly, a previous voltage level of the voltage B is logic low. Such circumstance means that a voltage level of the voltage B rises. Moreover, in response to the current voltage level of the voltage B with logic high, a current voltage level of the voltage Z is logic high. Accordingly, a previous voltage level of the voltage Z is logic low. Such circumstance means that a voltage level of the voltage Z rises. Therefore, the exemplary case illustrated in FIG. 6A is a case where the voltage B rises and the voltage Z rises, denoted B(R) & Z(R).

FIG. 6B is a diagram illustrating the fourth timing path Pth4 shown in FIG. 6A, in accordance with some embodiments. Referring to FIG. 6B, the fourth timing path Pth4 is derived from the logic circuit 10 shown in FIG. 6A. Presenting fourth timing path Pth4 in a way as shown in FIG. 6B facilitates analysis of an aging cost, as mentioned in the embodiment of FIG. 3B. By using the approach of the present disclosure, a worst case and a best case of forms of a DC vector can be evaluated and identified without performing a circuit simulation via, for example, an HSPICE tool. As a result, computational resource is efficient.

To simply the discussion, only the first timing path Pth1 is discussed below as shown in FIGS. 7A to 7D. However, analysis to the remaining timing paths Pth2, Pth3 and Pth4 are the same as that of the first timing path Pth1.

The number of the p-type transistor and the n-type transistor in the first timing path Pth1 is separately calculated. In the first timing path Pth1, the number of the p-type transistor is two, the transistors M3 and M4. Moreover, the number of the n-type transistor is one, the transistor M5.

Since the logic circuit 10 has two inputs 16 and 18, a DC vector has four forms, (0,0), (0,1), (1,0) and (1,1), wherein a first value in a bracket represents a voltage level of the voltage A, and a second value in the bracket represents a voltage level of the voltage B. A form of the DC vector determines whether a transistor is stressed or not, which will be described in detail with reference to FIGS. 7A to 7D.

Figure 7A:
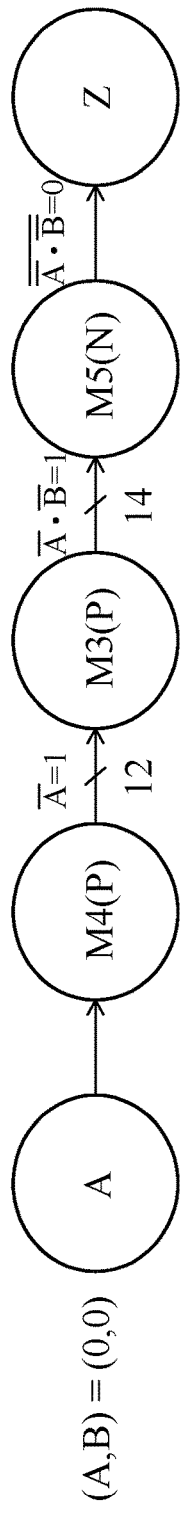
FIG. 7A is a diagram illustrating an operation of the first timing path shown in FIG. 6A in response to a first form of a DC vector, in accordance with some embodiments.

FIG. 7A is a diagram illustrating an operation of the first timing path Pth1 shown in FIG. 6A in response to a first form (0,0) of a DC vector, in accordance with some embodiments. Referring to FIG. 7A, a value at the internal node 12 based on the first form (0,0) and the boolean expression $\overline{A}$ is determined as 1. Since the transistor M4 is a p-type transistor and since a value at an output of the transistor M4 is 1 as determined above, the transistor M4 is stressed.

Similarly, a value at the internal node 14 based on the first form (0,0) and the boolean expression $\overline{A} \cdot \overline{B}$ is determined as 1. Since the transistor M3 is a p-type transistor and since a value at an output of the transistor M3 is 1 as determined above, the transistor M3 is stressed.

Also, a value at the output 19 based on the first form (0,0) and the boolean expression $\overline{A} \cdot \overline{B}$ is determined as 0. Since the transistor M5 is an n-type transistor and since a value at an output of the transistor M3 is 0 as determined above, the transistor M5 is stressed.

As a result, the quantity of the stressed p-type, associated with the first form (0,0), in the first timing path Pth1 is two, the transistors M3 and M4. The quantity of the stressed n-type, associated with the first form (0,0), in the first timing path Pth1 is one, the transistor M5.

Figure 7B:
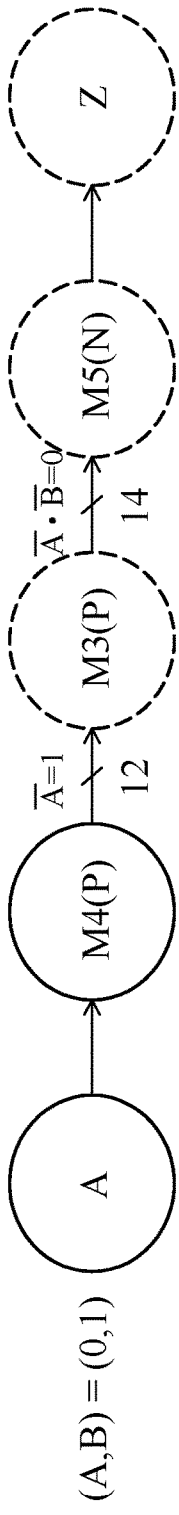
FIG. 7B is a diagram illustrating an operation of the first timing path shown in FIG. 6A in response to a second form of the DC vector, in accordance with some embodiments.

FIG. 7B is a diagram illustrating an operation of the first timing path Pth1 shown in FIG. 6A in response to the second form (0,1) of the DC vector, in accordance with some embodiments. Referring to FIG. 7B, a value at the internal node 12 based on the second form (0,1) and the boolean expression $\overline{A}$ is determined as 1. Since the transistor M4 is a p-type transistor and since a value at an output of the transistor M4 is 1 as determined above, the transistor M4 is stressed.

Similarly, a value at the internal node 14 based on the second form (0,1) and the boolean expression $\overline{A} \cdot \overline{B}$ is determined as 0. Since the transistor M3 is a p-type transistor and since a value at an output of the transistor M3 is 0 as determined above, the transistor M3 is not stressed.

Since the transistor M3 is not stressed, the determination to the transistor M5 subsequent to the transistor M3 is halted. In this way, computation resource is relatively efficient.

As a result, the quantity of the stressed p-type, associated with the second form (0,1), in the first timing path Pth1 is one, the transistor M4. The quantity of the stressed n-type, associated with the second form (0,1), in the first timing path Pth1 is zero.

Figure 7C:
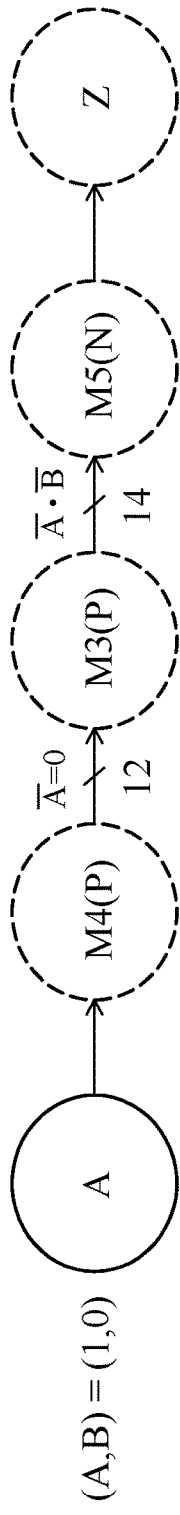
FIG. 7C is a diagram illustrating an operation of the first timing path shown in FIG. 6A in response to a third form of the DC vector, in accordance with some embodiments.

FIG. 7C is a diagram illustrating an operation of the first timing path Pth1 shown in FIG. 6A in response to the third form (1,0) of the DC vector, in accordance with some embodiments. Referring to FIG. 7C, a value at the internal node 12 based on the third form (1,0) and the boolean expression $\overline{A}$ is determined as 0. Since the transistor M4 is a p-type transistor and since a value at an output of the transistor M4 is 0 as determined above, the transistor M4 is not stressed.

Since the transistor M4 is not stressed, the determination to the transistors M5 and M3 subsequent to the transistor M4 is halted. In this way, computation resource is relatively efficient.

As a result, the quantity of the stressed p-type, associated with the third form (1,0), in the first timing path Pth1 is zero. The quantity of the stressed n-type, associated with the third form (1,0), in the first timing path Pth1 is zero.

Figure 7D:
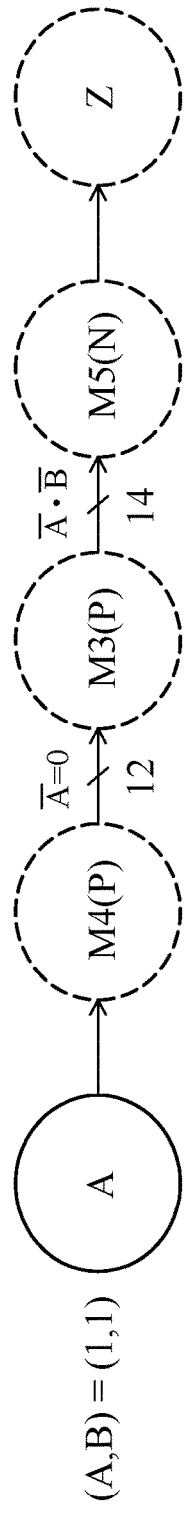
FIG. 7D is a diagram illustrating an operation of the first timing path shown in FIG. 6A in response to a fourth form of the DC vector, in accordance with some embodiments.

FIG. 7D is a diagram illustrating an operation of the first timing path Pth1 shown in FIG. 6A in response to the fourth form (1,1) of the DC vector, in accordance with some embodiments. Referring to FIG. 7D, a value at the internal node 12 based on the fourth form (1,1) and the boolean expression $\overline{A}$ is determined as 0. Since the transistor M4 is a p-type transistor and since a value at the output of the transistor M4 is 0 as determined above, the transistor M4 is not stressed.

Since the transistor M4 is not stressed, the determination to the transistors M5 and M3 subsequent to the transistor M4 is halted. In this way, computation resource is relatively efficient.

As a result, the quantity of the stressed p-type, associated with the fourth form (1,1), in the first timing path Pth1 is zero. The quantity of the stressed n-type, associated with the fourth form (1,1), in the first timing path Pth1 is zero.

After the analysis discussed in the embodiments of FIGS. 7A to 7D is completed, a cost function is calculated, thereby identifying which one among the first form (0,0), the second form (0,1), the third form (1,0) and the fourth form (1,1) results in a relatively high level or relatively low level or of an aging effect. When the one results in the most high level of the aging effect, the one is identified as a worst case. When the one results in the most low level of the aging effect, the one is identified a best case.

To calculate the cost function, a first weight value is assigned to a p-type transistor, and a second weight value is assigned to an n-type transistor. Generally, an aging effect caused by a p-type transistor is more serious than that caused by an n-type transistor. As a result, the first weight value is greater than the second weight value. However, the present disclosure is not limited thereto. To facilitate the following discussion, it is assumed that the first weight value is 1, and the second weight value is 0.

The cost function can be expressed in equation (1) as follows.

$$\text{Cost} = \frac{QSP \times W1 + QSN \times W2}{QP \times W1 + QN \times W2} \quad (1)$$

Where QP represents a quantity of a p-type transistor in a timing path, QN represents a quantity of a n-type transistor in the timing path; QSP represents the quantity of a stressed p-type transistor in the timing path; QSN represents the quantity of a stressed n-type transistor in the timing path; W1 represents a first weight value; and W2 represents a second weight value. A dominator in equation (1) can also be called a stress limit.

As mentioned above, the quantity of the p-type transistor in the first timing path Pth1 is 2; and the quantity of the n-type transistor is the first timing path Pth1 is 1. The quantity of the stressed p-type transistor and n-type transistor associated with the first, second, third and fourth forms (0,0), (0,1), (1,0) and (1,1) are discussed in the embodiments of FIGS. 7A to 7D. As result, the cost can be tabulated as Table 1.

TABLE 1

| Form | | | | | |
|---|---|---|---|---|---|
| A | B | Stress limit | QSP | QSN | Aging Cost |
| 0 | 0 | 2.1 | 2 | 1 | about 1.0 |
| 0 | 1 | 2.1 | 1 | 0 | about 0.48 |
| 1 | 0 | 2.1 | 0 | 0 | about 0 |
| 1 | 1 | 2.1 | 0 | 0 | about 0 |

From Table 1, it is realized that the aging cost related to the first from (0,0) is maximum, and the aging costs related to the third and fourth forms (1,0) and (1,1) are minimum. As a result, the first form (0,0) is identified as a worst case in a case A(F)&Z(F), which means that the first form (0,0) would result in the most serious aging effect in a case A(F)&Z(F). The third and fourth forms (1,0) and (1,1) are identified as a best case in a case A(F)&Z(F).

By repeating the approaches as mentioned above, a best case and a worst case for each of the remaining timing paths Pth2, Pth3 and Pt4 can be identified without performing a circuit simulation via, for example, an HSPICE tool. As a result, computational resource is efficient.

In some existing approaches, it is required to perform a circuit simulation on each of the first, second, third and fourth forms (0,0), (0,1), (1,0) and (1,1) to obtain the associated performances, such as the associated setup times, of the logic circuit 10, thereby determining which one is a worst case or which one is a best case in a case A(F)&Z(F). To perform the circuit simulation, a lot of computational resources are required and therefore is not efficient.

Figure 8:
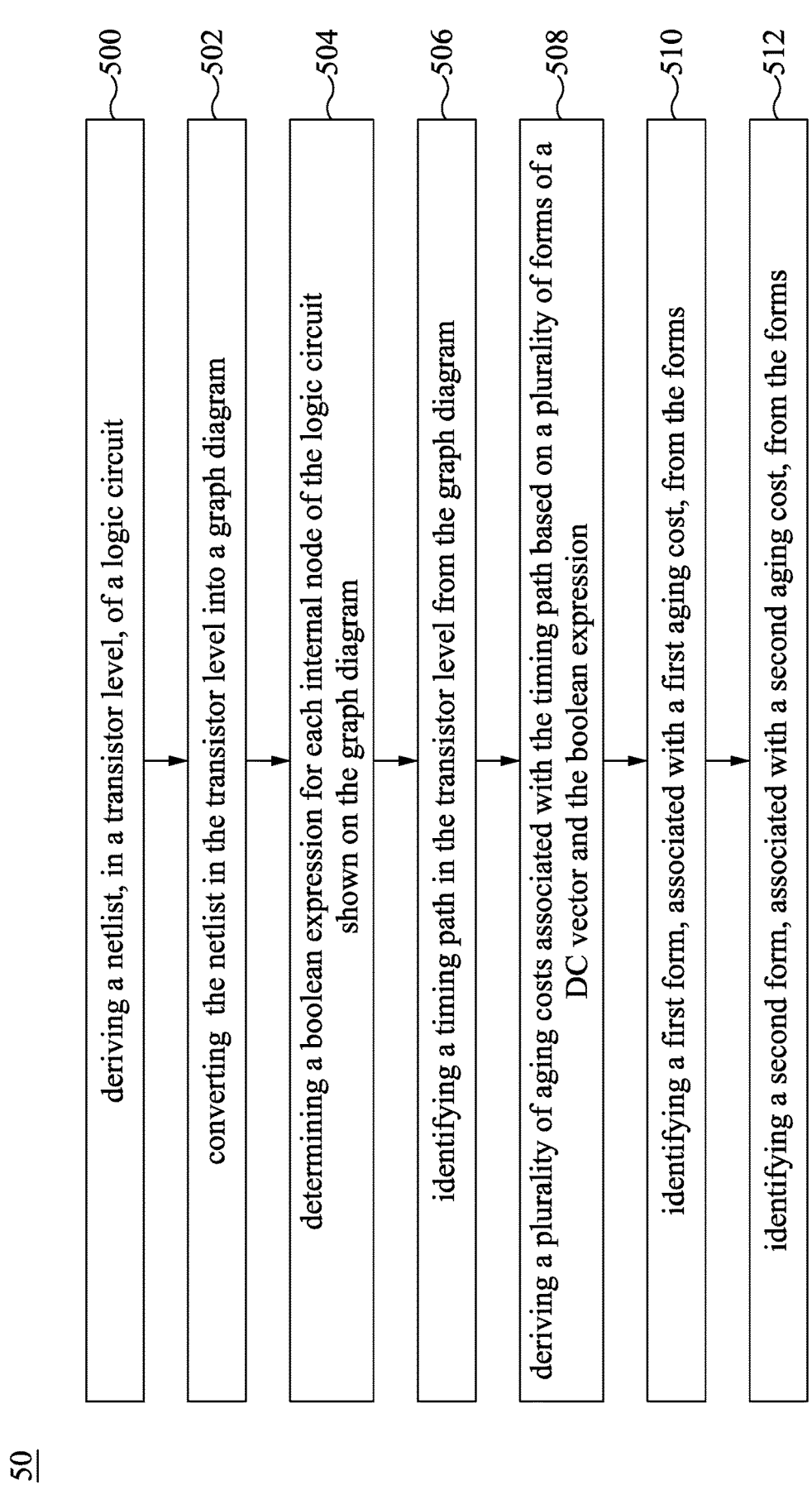
FIG. 8 is a flow diagram of a method, in accordance with some embodiments.

FIG. 8 is a flow diagram of a method 50, in accordance with some embodiments. Referring to FIG. 8, the method 50 includes operations 500, 502, 504, 506, 508, 510 and 512.

Figure 9:
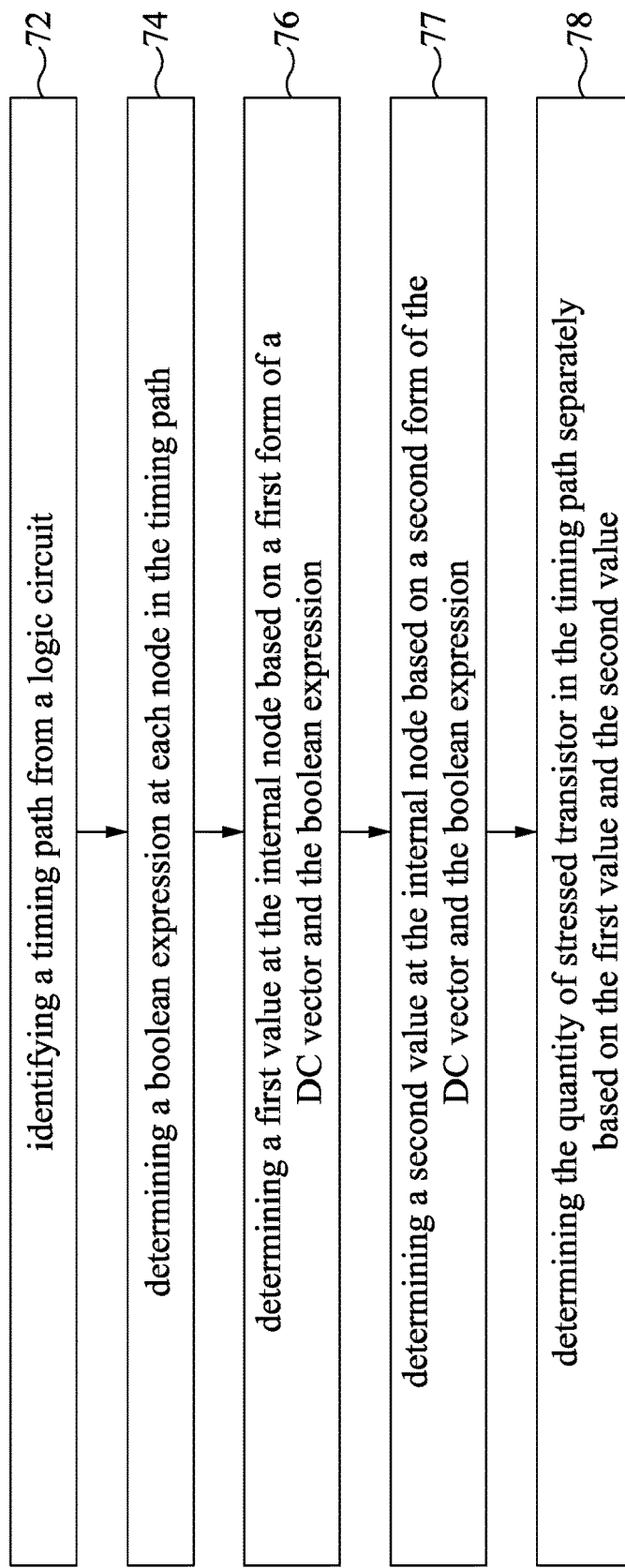
FIG. 9 is a flow diagram of a method, in accordance with some embodiments.
Figure 10A:
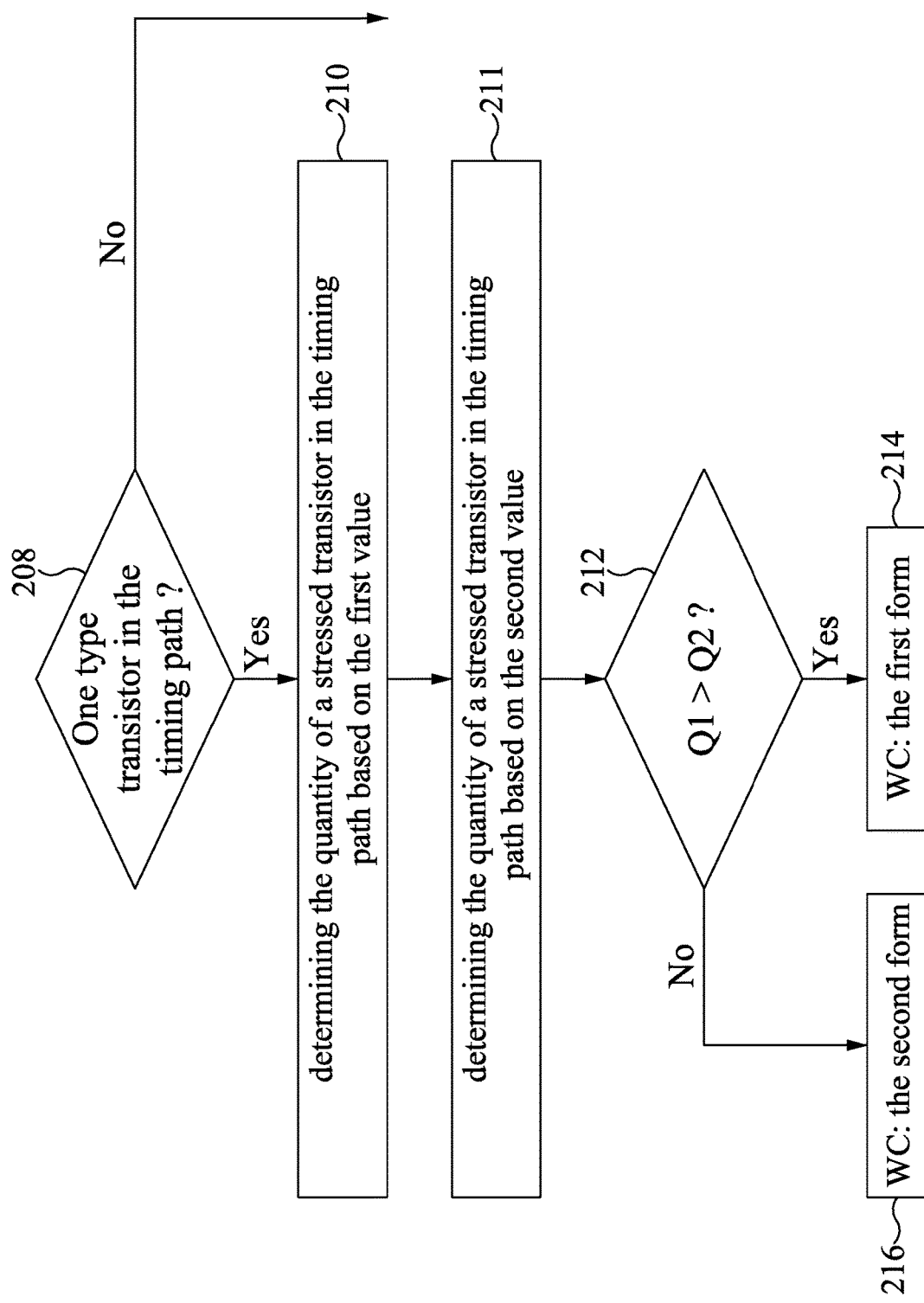
FIGS. 10A and 10B are flow diagrams showing determining the quantity of stressed transistors in the method shown in FIG. 9, in accordance with some embodiments.
Figure 10B:
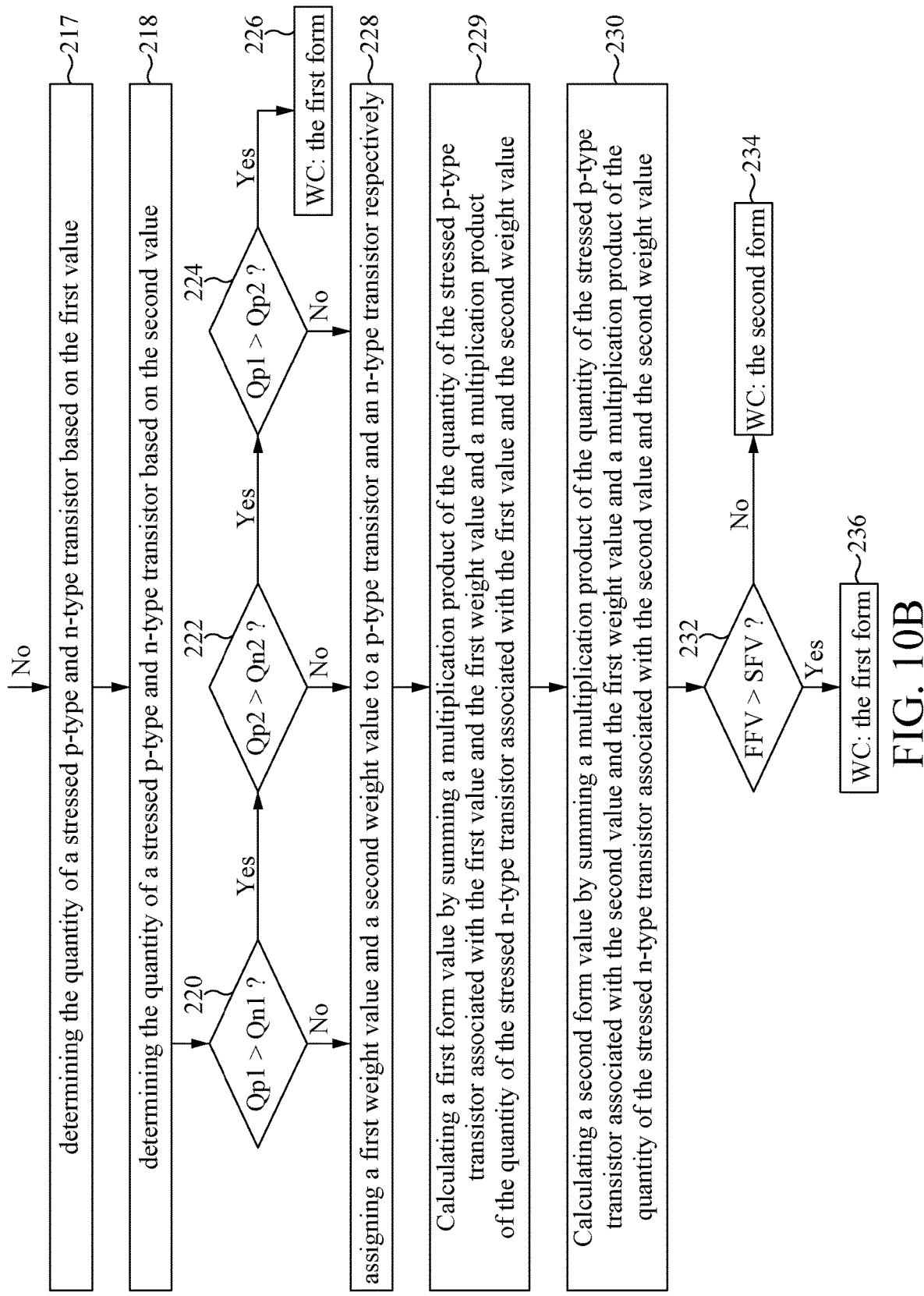

In operation 500, a netlist, in a transistor level, of a logic circuit 10 is derived. In operation 502, the netlist in the transistor level is converted into a graph diagram as shown in FIG. 1. In operation 504, a boolean expression is determined for each internal nodes 12 and 14 of the logic circuit 10 shown on the graph diagram. In operation 506, a timing path, such as the first timing path Pth1, in the transistor level is identified from the graph diagram. In operation 508, a plurality of aging costs, such as 1, 0.48, 0 and 0 associated with the timing path, such as the first timing path Pth1, are derived based on a plurality of forms of a DC vector and the boolean expression. In operation 510, a first form such as the first form (0,0), associated with a first aging cost, is identified from the forms. In operation 512, a second form, associated with a second aging cost less than the first form, is identified from the forms. By using the method 50, the computational resource is efficient FIG. 9 is a flow diagram of a method 70, in accordance with some embodiments. Referring to FIG. 9, the method 70 includes operations 72, 74, 76, 77 and 78. In operation 72, different from the method 50, a timing path is identified from a logic circuit. In operation 74, a boolean expression is determined at each node in the timing path. In operation 76, a first value at the internal node is determined based on a first form of a DC vector and the boolean expression. In operation 77, a second value at the internal node is determined based on a second form of the DC vector and the boolean expression. In operation 78, the quantity of stressed transistor in the timing path is determined separately based on the first value and the second value FIG. 10A is a flow diagram of operation 78 of the method 70 shown in FIG. 9, in accordance with some embodiments. FIG. 10B is a flow diagram of operation 78 of the method 70 shown in FIG. 9, in accordance with some embodiments. Referring to FIGS. 10A and 10B, operation 78 includes operations 208, 210, 211, 212, 214, 216, 217, 218, 220, 222, 224, 226, 228, 229, 230, 232, 234 and 236.

In operation 208, it is determined whether only one type transistor in the timing path. If negative, operation 78 proceeds to operation 217. If affirmative, operation 78 proceeds to operation 210, in which the quantity of a stressed transistor in the timing path is determined based on the first value. In operation 211, the quantity of a stressed transistor in the timing path is determined based on the second value. In operation 212, it is determined that whether the quantity of the stressed transistor associated with the first value is greater than that associated with the second value. If affirmative, then in operation 214 it is determined that the first form is the worst case. If not, in operation 216 it is determined that the second form is the worst case.

In operation 217, the quantity each of a stressed p-type and n-type transistor is determined based on the first value. In operation 218, the quantity each of a stressed p-type and n-type transistor is determined based on the second value. In operation 220, it is determined whether the quantity of the stressed p-type transistor associated with the first value is greater than that of the stressed n-type transistor associated with the first value. If negative, operation 78 proceeds to operation 228. If affirmative, operation 78 proceeds to operation 222, in which it is determined whether the quantity of the stressed p-type transistor associated with the second value is greater than that of the stressed n-type transistor associated with the second value. If negative, operation 78 proceeds to operation 228. If affirmative, operation 78 proceeds to operation 224, in which it is determined whether the quantity of the stressed p-type transistor associated with the first value is greater than that of the stressed p-type transistor associated with the second value. If negative, operation 78 proceeds to operation 224. If affirmative, operation 78 proceeds to operation 226, in which it is determined that the first form is the worst case.

In operation 224, a first weight value is assigned to a p-type transistor, and a second weight value is assigned to an n-type transistor. In operation 226, a first form value is calculated by summing a multiplication product of the quantity of the stressed p-type transistor associated with the first value and the first weight value and a multiplication product of the quantity of the stressed n-type transistor associated with the first value and the second weight value. In operation 228, a second form value is calculated by summing a multiplication product of the quantity of the stressed p-type transistor associated with the second value and the first weight value and a multiplication product of the quantity of the stressed n-type transistor associated with the second value and the second weight value.

In operation 230, it is determined whether the first form value is greater than the second form value. If affirmative, operation 78 proceeds to operation 236, in which the first form is determined as the worst case. If negative, operation 78 proceeds to operation 234, in which the second form is determined as the worst case.

Figure 11:
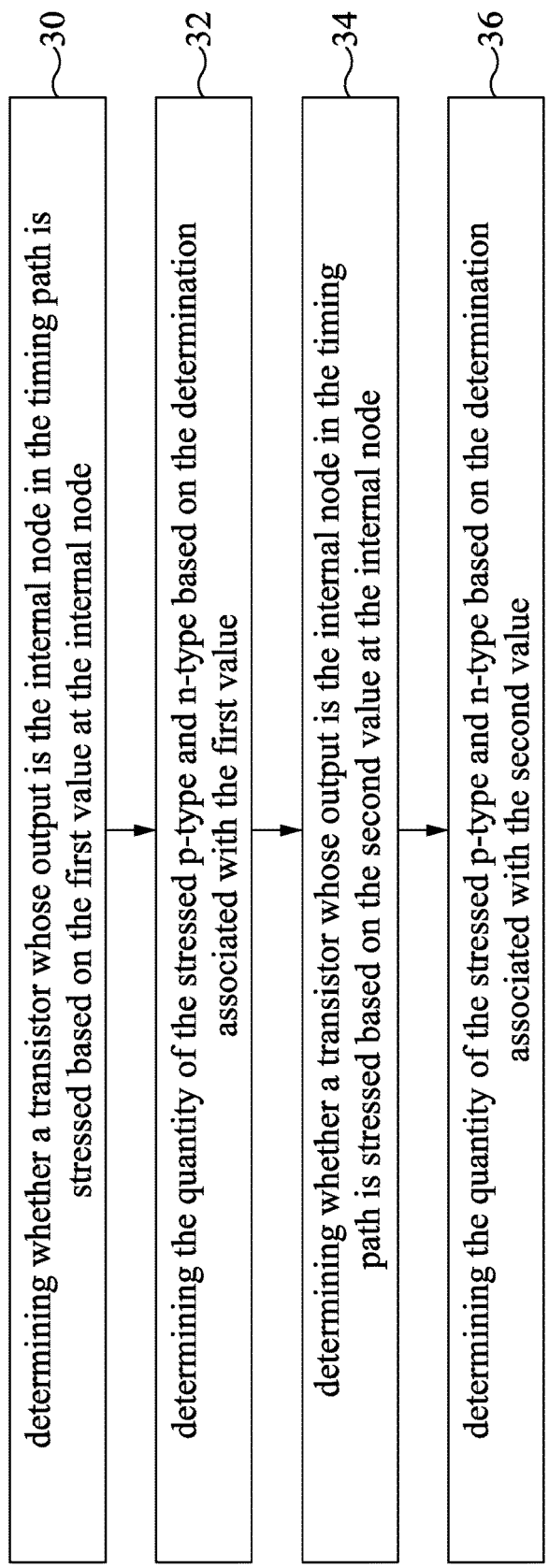
FIG. 11 is a flow diagram of operations 217 and 218 of operation 78 shown in FIG. 10B, in accordance with some embodiments.

FIG. 11 is a flow diagram of operations 217 and 218 of operation 78 shown in FIG. 10B, in accordance with some embodiments. Referring to FIG. 11, operations 217 and 218 include operations 30, 32, 34 and 36. In operation 30, it is determined whether a transistor whose output is the internal node in the timing path is stressed based on the first value at the internal node. In operation 32, the quantity of the stressed p-type and n-type is determined based on the determination associated with the first value. In operation 34, it is determined whether a transistor whose output is the internal node in the timing path is stressed based on the second value at the internal node. In operation 36, the quantity of the stressed p-type and n-type is determined based on the determination associated with the second value.

Figure 12:
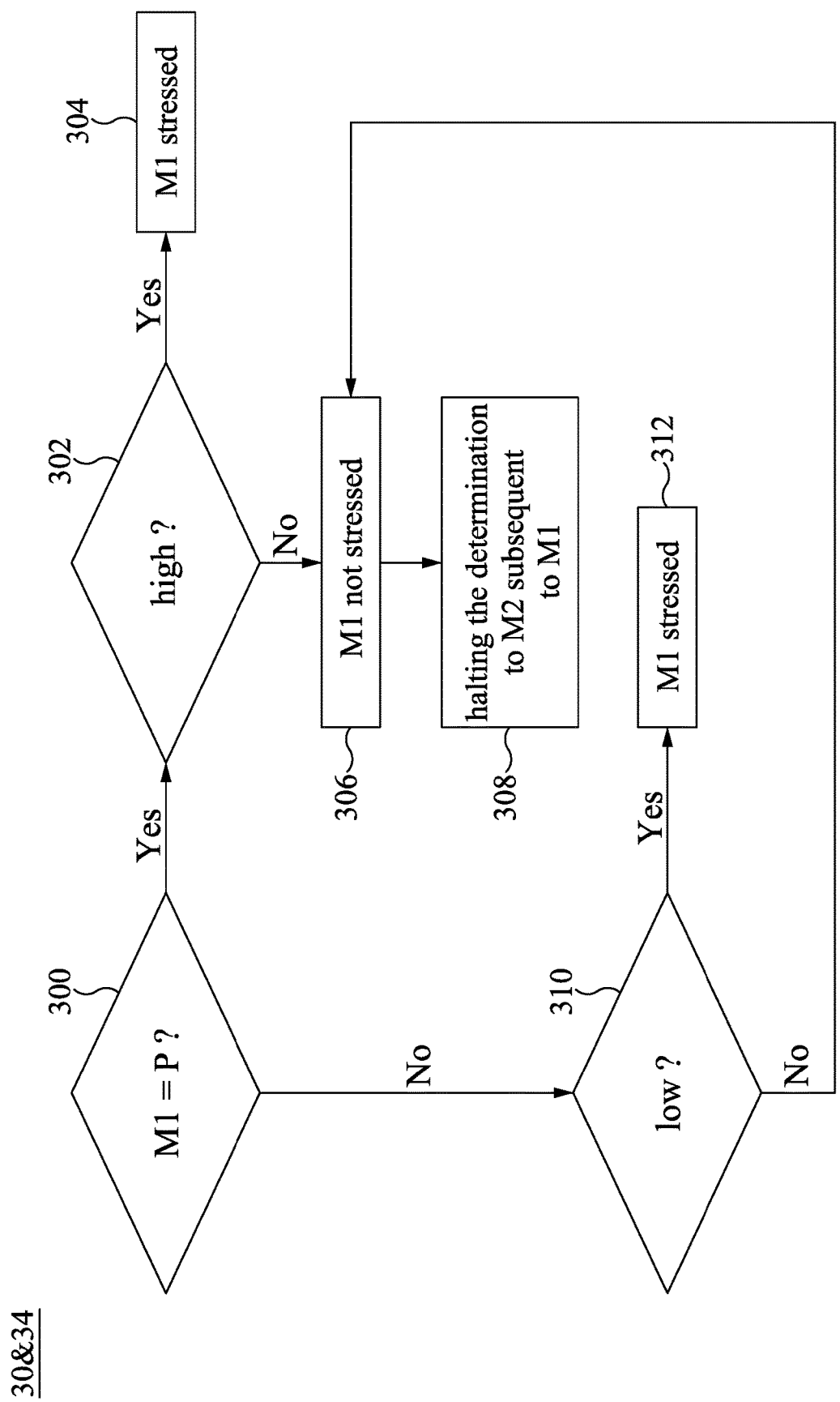
FIG. 12 is a flow diagram of operations 30 and 34 shown in FIG. 11, in accordance with some embodiments.

FIG. 12 is a flow diagram of operations 30 and 34 shown in FIG. 11, in accordance with some embodiments. Referring to FIG. 12, operations 30 and 34 includes operations 300, 302, 304, 306, 308, 310 and 312. In operation 300, it is determined whether a first transistor in a timing path is a p-type transistor. If negative, operations 30 and 34 proceeds to operation 310. If affirmative, it is determined whether a voltage level at an output of the first transistor is logic high. If affirmative, then in operation 304 the first transistor is determined as being stressed. If negative, then in operation 306 the first transistor 306 is determined as not stressed. In operation 308, the determination to a second transistor subsequent to the first transistor is halted.

In operation 310, it is determined whether the voltage level at the output of the first transistor is logic low. If affirmative, then in operation 312 the first transistor is determined as being stressed. If negative, then operation 306 is performed.

Figure 13:
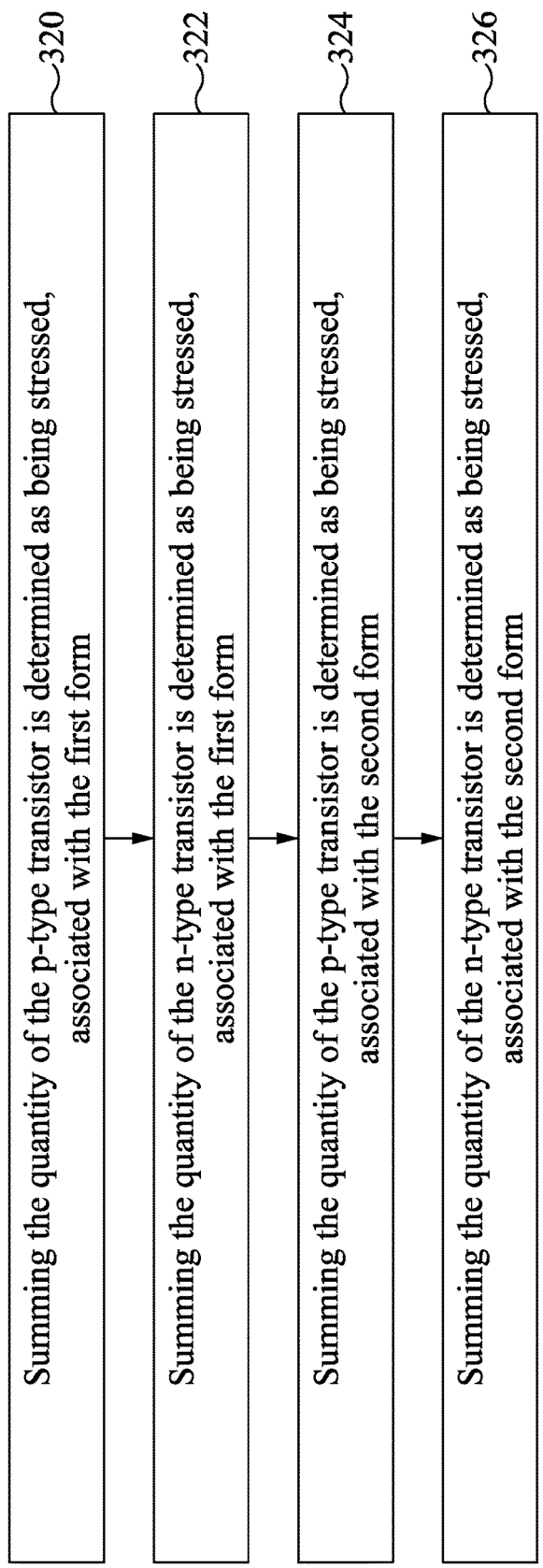
FIG. 13 is a flow diagram of operations 32 and 36 shown in FIG. 11, in accordance with some embodiments.

FIG. 13 is a flow diagram of operations 32 and 36 shown in FIG. 11, in accordance with some embodiments. Referring to FIG. 13, operations 32 and 36 include operations 320, 322, 324 and 326. In operation 320, the quantity of the p-type transistor is determined as being stressed, associated with the first form, is summed. In operation 322, the quantity of the n-type transistor is determined as being stressed, associated with the first form, is summed. In operation 324, the quantity of the p-type transistor is determined as being stressed, associated with the second form, is summed. In operation 326, the quantity of the n-type transistor is determined as being stressed, associated with the second form, is summed.

Figure 14:
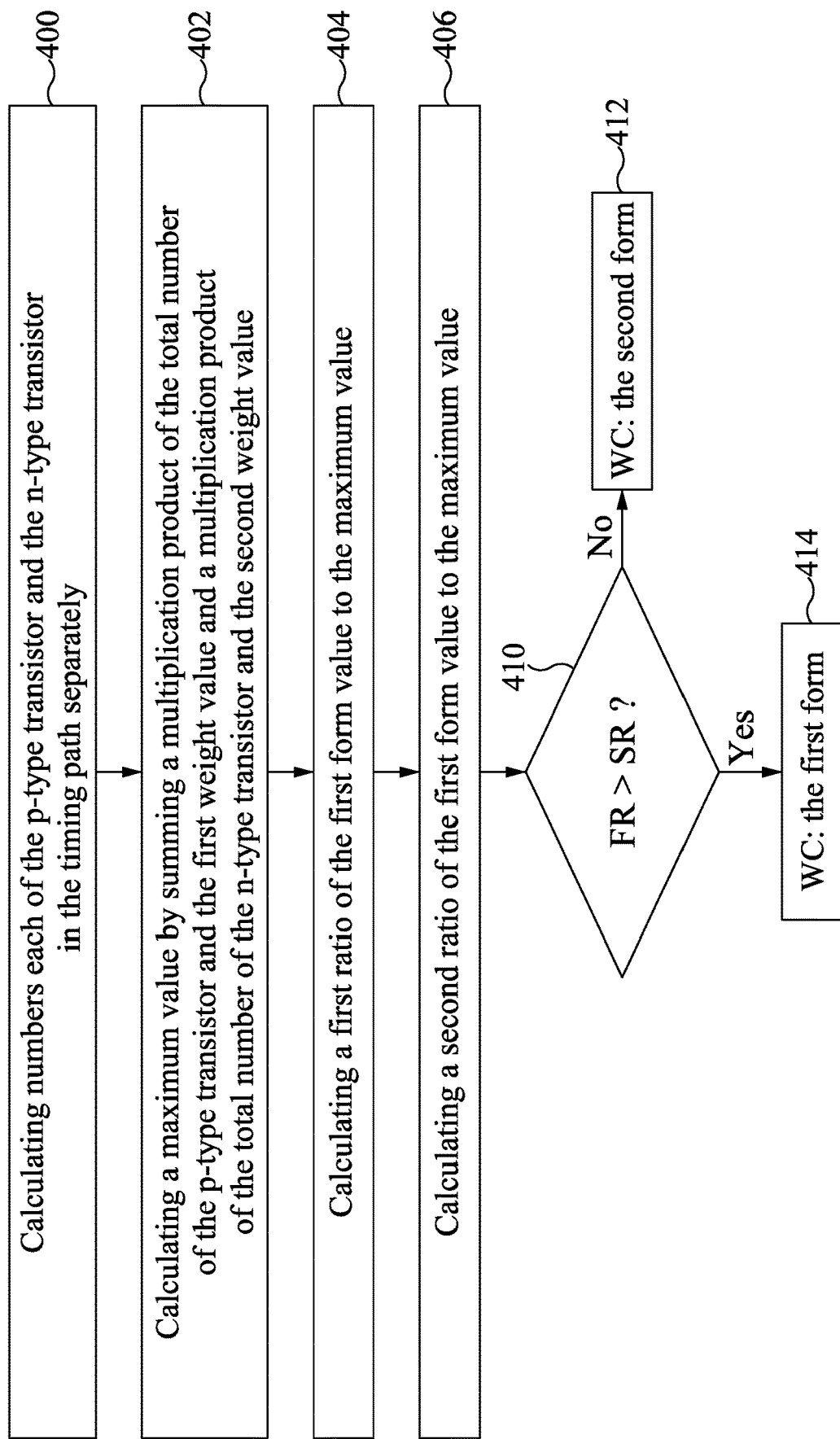
FIG. 14 is a flow diagram of operations, in accordance with some embodiments.

FIG. 14 is a flow diagram of operations 400, 402, 406, 408, 410, 412 and 414 in accordance with some embodiments. Referring to FIG. 14, operations 400, 402, 406, 408, 410, 412 and 414 replace operations 229, 230, 232, 234 and 236 shown in FIG. 10B. In operation 400, numbers of the p-type transistor and the n-type transistor in the timing path are calculated separately. In operation 402, a maximum value (or called stress limit) is calculated by summing a multiplication product of the total number of the p-type transistor and the first weight value and a multiplication product of the total number of the n-type transistor and the second weight value. In operation 406, a first ratio of the first form value to the maximum value is calculated. In operation 408, a second ratio of the first form value to the maximum value is calculated. In operation 410, it is determined whether the first ratio is greater than the second ratio. If affirmative, in operation 414 the first form is determined as the worst case. If negative, in operation 412 the second form is determined as the worst case.

Some embodiments have one or a combination of the following features and/or advantages. In some embodiments, a method is provided. The method includes identifying a timing path of a logic circuit; determining a boolean expression at an internal node in the timing path; determining a first value at the internal node based on a first form of a DC vector and the boolean expression; determining a second value at the internal node based on a second form of the DC vector and the boolean expression; and determining the quantity of a stressed transistor in the timing path separately based on the first value and the second value, wherein the quantity of stressed transistor is a factor determining a level of an aging effect.

In some embodiments, a method is provided. The method includes deriving a logic circuit from a netlist; identifying a timing path of a logic circuit; determining a boolean expression at an internal node of the logic circuit; determining a first value at the internal node based on a first form of a DC vector and the boolean expression; determining a second value at the internal node based on a second form of the DC vector and the boolean expression; and determining the quantity of a stressed transistor in the timing path separately based on the first value and the second value, wherein the amount of stressed transistor is a factor determining a level of an aging effect.

In some embodiments, a method is provided. The method includes identifying a timing path in a transistor level from a graph diagram; calculating a plurality of aging costs associated with the timing path based on a plurality of forms of a DC vector; identifying a first form, associated with a first aging cost of the aging costs, from the forms; and identifying a second form, associated with a second aging cost less than the first aging cost, from the forms The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method, comprising:
    identifying a timing path of a logic circuit;
    determining a boolean expression at an internal node in the timing path;
    determining a first value at the internal node based on a first form of a DC vector and the boolean expression;
    determining a second value at the internal node based on a second form of the DC vector and the boolean expression; and
    determining a quantity of a stressed transistor in the timing path separately based on the first value and the second value, wherein the quantity of the stressed transistor is a factor determining a level of an aging effect, wherein the determination of the quantity of the stressed transistor comprises:
        determining the quantity of the stressed transistor in the timing path separately based on the first value and the second value when only a single type transistor exists in the timing path; and
        determining that the first form results in a higher level of the aging effect than the second form when the quantity of the stressed transistor in the timing path associated with the first form is greater than that associated with the second form.

2. The method as claimed in claim 1, wherein the determining the quantity of the stressed transistor in the timing path separately based on the first value and the second value includes:
    calculating the quantity of a stressed p-type and n-type transistor separately based on the first value and the second value when two types transistors exist in the timing path; and
    determining that the first form results in a higher level of the aging effect than the second form
    when the quantity of a stressed p-type transistor, associated with the first form, in the timing path is greater than that of a stressed n-type transistor, associated with the first form,
    the quantity of a stressed p-type transistor, associated with the second form, in the timing path is greater than that of a stressed n-type transistor, associated with the second form, and
    the quantity of the stressed p-type transistor, associated with the first form, in the timing path is greater than that of the stressed p-type transistor, associated with the second form, in the timing path.

3. The method as claimed in claim 1, wherein the determining the quantity of the stressed transistor in the timing path separately based on the first value and the second value includes:
    determining whether a transistor whose output is the internal node in the timing path is stressed based on the first value at the internal node;
    determining the quantity of the stressed p-type and n-type transistor based on the determination associated with the first value;
    determining whether a transistor whose output is the internal node in the timing path is stressed based on the second value at the internal node; and
    determining the quantity of the stressed p-type and n-type transistor based on the determination associated with the second value.

4. The method as claimed in claim 3, wherein the transistor is a first transistor, and wherein the determining whether a transistor whose output is the internal node in the timing path is stressed based on the first value at the internal node includes:
    halting the determination at a second transistor in the timing path subsequent to the first transistor whose output is the internal node in the timing path when the first transistor is determined to be not stressed.

5. The method as claimed in claim 3, wherein the determining whether the transistor whose output is the internal node in the timing path is stressed based on the first value at the internal node includes:
    determining that the transistor in the timing path is stressed when the transistor is a p-type transistor and the first value at the output of the transistor is logic high; and
    determining that the transistor is not stressed when the transistor is a p-type transistor and the first value at the output of the transistor is logic low.

6. The method as claimed in claim 3, wherein the determining whether the transistor whose output is the internal node in the timing path is stressed based on the first value at the internal node includes:
   determining that the transistor is stressed when the transistor is an n-type transistor and the first value at the output of the transistor is logic low; and
   determining that the transistor is not stressed when the transistor is an n-type transistor and the first value at the output of the transistor is logic high.

7. The method as claimed in claim 3, wherein the determining the quantity of the stressed p-type and n-type transistor based on the determination associated with the first value includes:
   summing a quantity of the p-type transistor determined to be stressed, associated with the first form; and
   summing a quantity of the n-type transistor determined to be stressed, associated with the first form.

8. The method as claimed in claim 3, wherein the determining the quantity of the stressed transistor in the timing path separately based on the first value and the second value includes:
   assigning a first weight value and a second weight value to a p-type transistor and an n-type transistor, respectively, when two types transistors exist in the timing path;
   calculating respectively a first form value and a second form value by summing a multiplication of the quantity of the stressed p-type transistor and the first weight value and a multiplication of the quantity of the stressed n-type transistor and the second weight value, associated with the first form and the second form; and
   determining that the first form results in a higher level of the aging effect than the second form when the first form value is greater than the second form value.

9. The method as claimed in claim 3, wherein the determining the quantity of the stressed transistor in the timing path separately based on the first value and the second value includes:
   assigning a first weight value and a second weight value to a p-type transistor and an n-type transistor, respectively, when two types transistors exist in the timing path;
   calculating total quantities of a p-type transistor and an n-type transistor in the timing path separately;
   calculating a maximum value by summing a multiplication of the total quantity of the p-type transistor and the first weight value and a multiplication of the total quantity of the n-type transistor and the second weight value;
   calculating respectively a first form value and a second form value by summing a multiplication of the quantity of the stressed p-type transistor and the first weight value and a multiplication of the quantity of the stressed n-type transistor and the second weight value, associated with the first form and the second form;
   calculating a first ratio of the first form value to the maximum value;
   calculating a second ratio of the second form value to the maximum value; and
   determining that the first form results in a higher level of the aging effect than the second form when the first ratio is greater than the second ratio.

10. A method, comprising:
    deriving a logic circuit from a netlist;
    identifying a timing path of a logic circuit;
    determining a boolean expression at an internal node of the logic circuit;
    determining a first value at the internal node based on a first form of a DC vector and the boolean expression;
    determining a second value at the internal node based on a second form of the DC vector and the boolean expression; and
    determining a quantity of a stressed transistor in the timing path separately based on the first value and the second value, wherein the quantity of the stressed transistor is a factor determining a level of an aging effect, wherein the determination of the stressed transistor comprises:
    calculating the quantity of a stressed p-type and n-type transistor separately based on the first value and the second value when two types transistors exist in the timing path; and
    determining that the first form results in a higher level of the aging effect than the second form
    when the quantity of a stressed p-type transistor, associated with the first form, in the timing path is greater than that of a stressed n-type transistor, associated with the first form,
    the quantity of a stressed p-type transistor, associated with the second form, in the timing path is greater than that of a stressed n-type transistor, associated with the second form, and
    the quantity of the stressed p-type transistor, associated with the first form, in the timing path is greater than that of the stressed p-type transistor, associated with the second form, in the timing path.

11. The method as claimed in claim 10, wherein the determining the quantity of the stressed transistor in the timing path separately based on the first value and the second value includes:
    determining the quantity of a stressed transistor in the timing path separately based on the first value and the second value when only a single type transistor exists in the timing path; and
    determining that the first form results in a higher level of the aging effect than the second form when the quantity of the stressed transistor in the timing path associated with the first form is greater than that associated with the second form.

12. The method as claimed in claim 10, wherein the determining the quantity of the stressed transistor in the timing path separately based on the first value and the second value includes:
    determining whether a transistor whose output is the internal node in the timing path is stressed based on the first value at the internal node;
    determining the quantity of the stressed p-type and n-type transistor based on the determination associated with the first value;
    determining whether a transistor whose output is the internal node in the timing path is stressed based on the second value at the internal node; and
    determining the quantity of the stressed p-type and n-type transistor based on the determination associated with the second value.

13. The method as claimed in claim 12, wherein the transistor is a first transistor, and wherein the determining whether a transistor whose output is the internal node in the timing path is stressed based on the first value at the internal node includes:
    halting the determination at a second transistor in the timing path subsequent to the first transistor whose output is the internal node in the timing path when the first transistor is determined to be not stressed.

14. The method as claimed in claim 12, wherein the determining whether the transistor whose output is the internal node in the timing path is stressed based on the first value at the internal node includes:
- determining that the transistor in the timing path is stressed when the transistor is a p-type transistor and the first value at the output of the transistor is logic high; and
- determining that the transistor is not stressed when the transistor is a p-type transistor and the first value at the output of the transistor is logic low.

15. The method as claimed in claim 12, wherein the determining whether the transistor whose output is the internal node in the timing path is stressed based on the first value at the internal node includes:
- determining that the transistor is stressed when the transistor is an n-type transistor and the first value at the output of the transistor is logic low; and
- determining that the transistor is not stressed when the transistor is an n-type transistor and the first value at the output of the transistor is logic high.

16. A method, comprising:
- identifying a timing path in a transistor level from a logic circuit;
- calculating an aging cost for each of a plurality of forms of a DC vector based on a quantity of a stressed transistor on the timing path, wherein the aging cost is a ratio of the quantity of the stressed transistor to a total quantity of transistors of the logic circuit; and
- identifying a candidate form from the forms as a worst case when the aging cost associated with the candidate form is a maximum among the aging costs.

17. The method as claimed in claim 16, wherein the identification of the timing path comprises:
- identifying the timing path in the transistor level from a graph diagram of the logic circuit.

\* \* \* \* \*